United States Patent
Aoyagi et al.

(10) Patent No.: US 12,058,420 B2
(45) Date of Patent: Aug. 6, 2024

(54) IMAGE PROCESSING APPARATUS, DISPLAY CONTROL METHOD, AND PROGRAM

(71) Applicant: Saturn Licensing LLC, New York, NY (US)

(72) Inventors: Mitsutoshi Aoyagi, Tokyo (JP); Hidetaka Honji, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 156 days.

(21) Appl. No.: 17/269,418

(22) PCT Filed: Aug. 15, 2019

(86) PCT No.: PCT/JP2019/032047
§ 371 (c)(1),
(2) Date: Feb. 18, 2021

(87) PCT Pub. No.: WO2020/045108
PCT Pub. Date: Mar. 5, 2020

(65) Prior Publication Data
US 2021/0195296 A1 Jun. 24, 2021

(30) Foreign Application Priority Data

Aug. 29, 2018 (JP) .................................. 2018-160184
Jul. 3, 2019 (JP) .................................. 2019-124200

(51) Int. Cl.
*H04N 21/485* (2011.01)
*H04N 5/57* (2006.01)
*H04N 21/431* (2011.01)

(52) U.S. Cl.
CPC .......... *H04N 21/4854* (2013.01); *H04N 5/57* (2013.01); *H04N 21/431* (2013.01)

(58) Field of Classification Search
CPC ..... H04N 21/4854; H04N 5/57; H04N 21/431
(Continued)

(56) References Cited

U.S. PATENT DOCUMENTS

2010/0034525 A1* 2/2010 Maruyama ..... H04N 21/440218
386/353
2010/0110297 A1* 5/2010 Kameoka ........... H04N 21/4622
348/739

(Continued)

FOREIGN PATENT DOCUMENTS

| CN | 1459089 | 11/2003 |
| CN | 101661739 | 3/2010 |

(Continued)

OTHER PUBLICATIONS

International Search Report for PCT/JP2019/032047 mailed Nov. 12, 2019; 3 pages.

*Primary Examiner* — John W Miller
*Assistant Examiner* — Omer Khalid
(74) *Attorney, Agent, or Firm* — Richard LaPeruta

(57) ABSTRACT

The present technology relates to an image processing apparatus, a display control method, and a program that enable a user to view a video image as intended by a content provider side.
In an image processing apparatus according to one aspect of the present technology, an image quality adjustment menu is displayed that includes display related to setting of an image quality adjustment mode for a specific distribution service, in a case where an instruction is made to perform image quality adjustment during execution of an application that is used for viewing a content distributed by the specific distribution service. The present technology can be applied to television receivers that support video image content distribution services.

16 Claims, 23 Drawing Sheets

(58) Field of Classification Search
USPC .......................................................... 348/571
See application file for complete search history.

(56) References Cited

U.S. PATENT DOCUMENTS

2013/0002695 A1    1/2013   Kohno et al.
2018/0302663 A1    10/2018  Yoshizawa et al.

FOREIGN PATENT DOCUMENTS

| | | | | | |
|---|---|---|---|---|---|
| CN | 108028958 | A | | 5/2018 | |
| CN | 108307220 | A | * | 7/2018 | ........... G06F 3/0482 |
| EP | 2495962 | A1 | | 9/2012 | |
| JP | 2006015722 | A | * | 1/2006 | ........... B41J 2/1752 |
| JP | 2006157222 | A | | 6/2006 | |
| JP | 2008125066 | A | | 5/2008 | |
| JP | 2008301299 | A | * | 12/2008 | |
| JP | 2008301299 | A | | 12/2008 | |
| JP | 2009049808 | A | * | 3/2009 | ......... H04N 21/4852 |
| JP | 2009049808 | A | | 3/2009 | |
| JP | 2009171232 | A | * | 7/2009 | ............. G08C 17/00 |
| JP | 2010060863 | A | | 3/2010 | |
| JP | 2010060863 | A | * | 3/2010 | ............... H04N 5/14 |
| JP | 2010124429 | A | | 6/2010 | |
| JP | 201746040 | A | | 3/2017 | |
| JP | 2017046040 | A | * | 3/2017 | |
| JP | 2017069935 | | | 4/2017 | |
| KR | 20110107994 | A1 | * | 5/2011 | |

* cited by examiner

IMAGE PROCESSING APPARATUS, DISPLAY CONTROL METHOD, AND PROGRAM

CROSS-REFERENCE TO RELATED APPLICATIONS

This application is a national phase entry under 35 U.S.C. § 371 of International Application No. PCT/JP2019/032047 filed Aug. 15, 2019, which claims the priority from Japanese Patent Application No. 2018-160184 filed in the Japanese Patent Office on Aug. 29, 2018 and Japanese Patent Application No. 2019-124200 filed in the Japanese Patent Office on Jul. 3, 2019, the entire contents of which are hereby incorporated by reference.

TECHNICAL FIELD

The present technology relates to an image processing apparatus, a display control method, and a program. In particular, the present technology relates to an image processing apparatus, a display control method, and a program that enable a user to view a video image as intended by a content provider side.

BACKGROUND ART

In recent years, distribution services for video-image contents such as movies and television programing have become widespread.

There are also distribution services that distribute not only contents that contain a standard dynamic range (SDR) video image, but also contents that contain a high dynamic range (HDR) video image with an expanded dynamic range.

CITATION LIST

Patent Document

Patent Document 1: Japanese Patent Application Laid-Open No. 2010-124429

SUMMARY OF THE INVENTION

Problems to be Solved by the Invention

On a content provider side, it is preferable that a user views a video image with image quality intended by the provider.

When the user adjusts brightness by himself/herself using an image quality adjustment function of a TV, a video image with image quality different from the image quality intended by the provider may be displayed.

The present technology has been made in view of such a situation, and an object is to enable a user to view a video image as intended by a content provider side.

Solutions to Problems

An image processing apparatus of one aspect of the present technology includes a display control unit that controls to display an image quality adjustment menu including display related to setting of an image quality adjustment mode for a specific distribution service, in a case where an instruction is made to perform image quality adjustment during execution of an application that is used for viewing a content distributed by the specific distribution service.

In one aspect of the present technology, in a case where an instruction is made to perform image quality adjustment during execution of an application that is used for viewing a content distributed by a specific distribution service, an image quality adjustment menu is displayed that includes display related to setting of an image quality adjustment mode for the specific distribution service.

MODE FOR CARRYING OUT THE INVENTION

Hereinafter, an embodiment for implementing the present technology will be described. The description will be given in the following order.
1. Configuration of content distribution system
2. Display of image quality adjustment menu
3. Configuration and operation of TV
4. Modified example 5. Example of case where there are multiple specific distribution services <Configuration of Content Distribution System>

Figure 1:
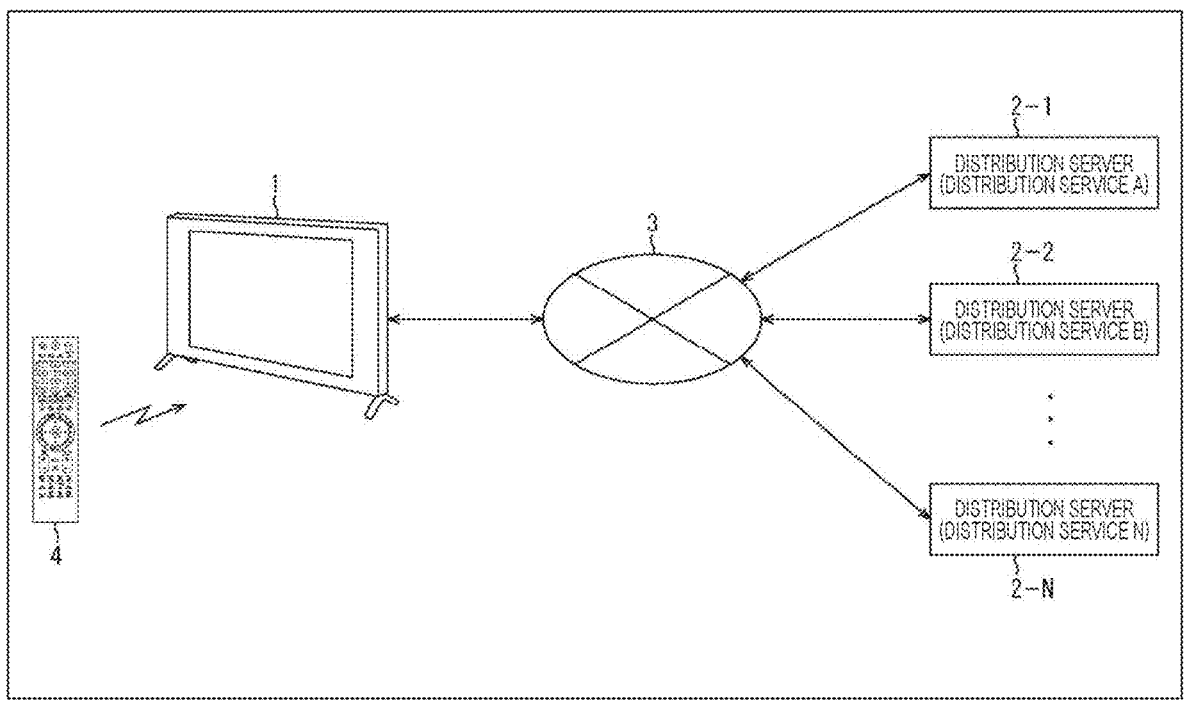
FIG. 1 is a diagram showing a configuration example of a content distribution system.

FIG. 1 is a diagram showing a configuration example of a content distribution system according to an embodiment of the present technology.

The content distribution system of FIG. 1 is configured by connecting a TV 1 and distribution servers 2-1 to 2-N via a network 3 such as the Internet. For operation of the TV 1, a remote controller 4 is used. From the remote controller 4 to the TV 1, a command corresponding to a button pressed by a user is transmitted.

Between the TV 1 and the distribution servers 2-1 to 2-N, communication via the network 3 is performed. The network 3 may be in any form of a wired network, a wireless network, or a combination of wired and wireless networks. Hereinafter, the distribution servers 2-1 to 2-N are referred to as a distribution server 2 as appropriate, in a case where it is not necessary to distinguish from each other.

The TV 1, which is an image processing apparatus, receives television broadcasts such as terrestrial digital broadcasts, satellite broadcasts, and cable broadcasts broadcast by broadcasting stations (not shown). Broadcasting of programing by the broadcasting stations is carried out in accordance with a predetermined schedule for each channel.

The TV 1 displays a video image of the broadcast programing on a display device, and outputs sound from a speaker. For example, the display device of the TV 1 is a display device having so-called 4K resolution (3840×2160) pixels and supporting HDR video image display.

Furthermore, the TV 1 has not only a function of receiving programing provided by broadcasting but also a function of receiving a content provided via the network 3. The content is provided via the network 3, for example, by streaming. The content may also be provided by download.

The TV 1 controls to display a main screen of the distribution service on the display device, in a case where a predetermined distribution service is selected by, for example, an operation using the remote controller 4. In the TV 1, it is possible to use multiple distribution services provided individually by different business operators.

The TV 1 receives and reproduces the content transmitted from the distribution server 2. The TV 1 displays a video image obtained by reproducing video data included in the content on the display device, and outputs sound obtained by reproducing audio data from the speaker.

The distribution server 2 is a server to provide a distribution service. The distribution server 2-1 is a server to provide a distribution service A, and the distribution server 2-2 is a server to provide a distribution service B. The distribution server 2-N is a server to provide a distribution service N.

One distribution service may be provided by one distribution server 2, or may be provided by multiple distribution servers 2. It is also possible to allow multiple distribution services to be provided by one distribution server 2.

In this way, the user of the TV 1 can select a predetermined distribution service from multiple distribution services, and view a content provided by the selected distribution service. The TV 1 is equipment equipped with a general-purpose operating system (OS), and is installed with applications for using individual distribution services.

Figure 2:
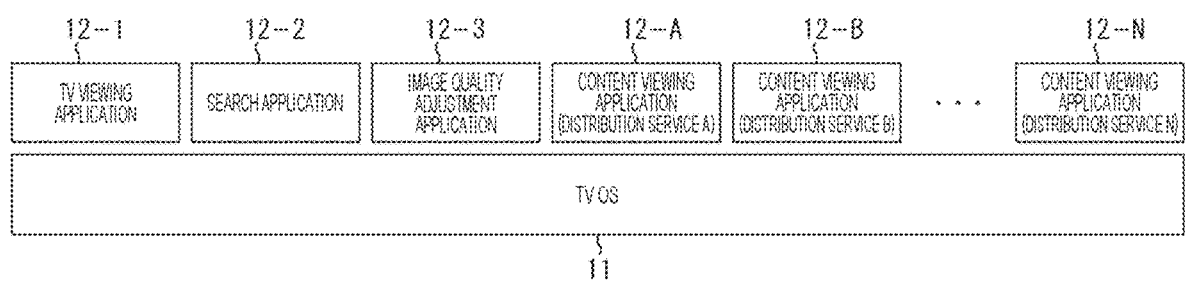
FIG. 2 is a diagram showing an example of an application structure of a TV.

FIG. 2 is a diagram showing an example of an application structure of the TV 1.

The TV 1 is equipped with a TV OS 11. Various applications that operate on the TV OS 11 are installed on the TV 1. The example of FIG. 2 shows a TV viewing application 12-1, a search application 12-2, an image quality adjustment application 12-3, and a content viewing applications 12-A to 12-N.

The TV viewing application 12-1 is an application that manages viewing of broadcast programing. While the TV viewing application 12-1 is running, the user can operate the remote controller 4 to select a predetermined channel and view programing broadcast on the selected channel.

The search application 12-2 is an application that searches for information on the Web on the basis of a keyword inputted by the user by operating the remote controller 4 or by sound.

The image quality adjustment application 12-3 is an application that manages image quality adjustment of the display device of the TV 1. In a case where the user instructs performing of image quality adjustment, the image quality adjustment application 12-3 controls to display an image quality adjustment menu, which is a graphical user interface (GUI) for setting various items related to the image quality.

The image quality adjustment application 12-3 sets image quality adjustment parameters of various items such as a picture mode, brightness, and hue, in accordance with a user's operation on the image quality adjustment menu. An image quality adjustment function and an image quality adjustment menu display function of the image quality adjustment application 12-3 may be provided as functions of the TV OS 11.

The content viewing application 12-A is an application for using the distribution service A provided by the distribution server 2-1.

For example, when the content viewing application 12-A is starting-up, a main screen of the distribution service A is displayed on the TV 1 on the basis of information transmitted from the distribution server 2-1. The main screen displays information regarding viewable contents, such as titles and thumbnail images, and the user can see these pieces of information and select a desired content. When the user selects a predetermined content, distribution of the content is started.

The content viewing application 12-B is an application for using the distribution service B provided by the distribution server 2-2.

Although not shown in FIG. 2, dedicated applications for using other distribution services are individually installed on the TV 1.

Furthermore, the TV 1 is also installed with applications such as a video application used for viewing recorded programing recorded on an external recording medium such as a hard disk drive (HDD), and a Web browser used for displaying a Web page.

For example, the TV viewing application 12-1, the search application 12-2, and the image quality adjustment application 12-3 are software prepared by a manufacturer that carries out manufacturing, selling, and the like of the TV 1. The content viewing applications 12-A to 12-N are software prepared by business operators of the respective distribution services.

<Display of Image Quality Adjustment Menu>

Here, a display example of the image quality adjustment menu will be described. The image quality adjustment menu is displayed differently between a case where a content of a specific distribution service is being viewed and other cases.

In the following, it is assumed that the distribution service A provided by the distribution server 2-1 is the specific distribution service.

Example of During Programing Viewing

Figure 3:
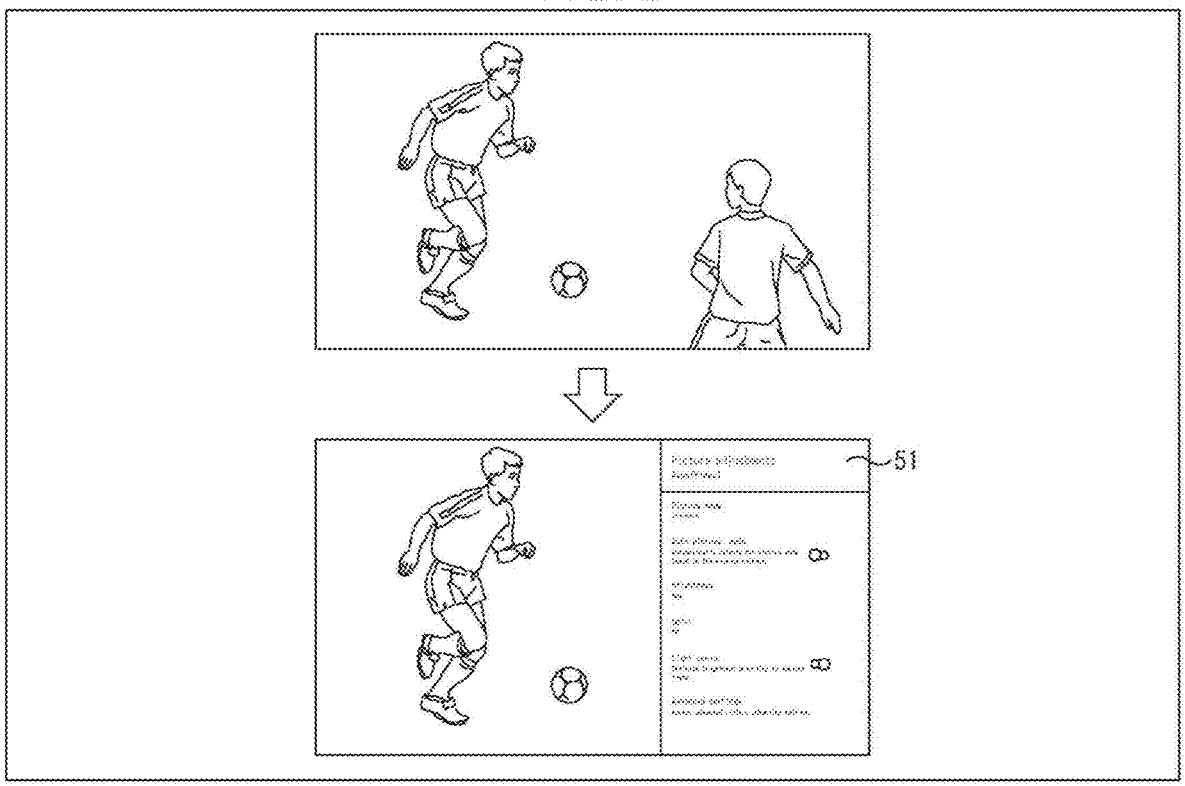
FIG. 3 is a view showing a display example of an image quality adjustment menu during programing viewing.

FIG. 3 is a view showing a display example of the image quality adjustment menu during programing viewing.

Soccer broadcast programing shown in an upper part of FIG. 3 is, for example, recorded programing. That is, a screen shown in the upper part of FIG. 3 is a screen when the video application used for viewing recorded programing is running. Recorded programing selected by the user is reproduced by the video application, and a video image is displayed on the display device.

In a case where an instruction is made to perform image quality adjustment while the screen as shown in the upper part of FIG. 3 is displayed, an image quality adjustment menu 51 is displayed at a right edge of the screen, as shown at a tip of the arrow. In an area other than the display area of the image quality adjustment menu 51 in the entire screen, the video image of the recorded programing continues to be displayed.

Figure 4:
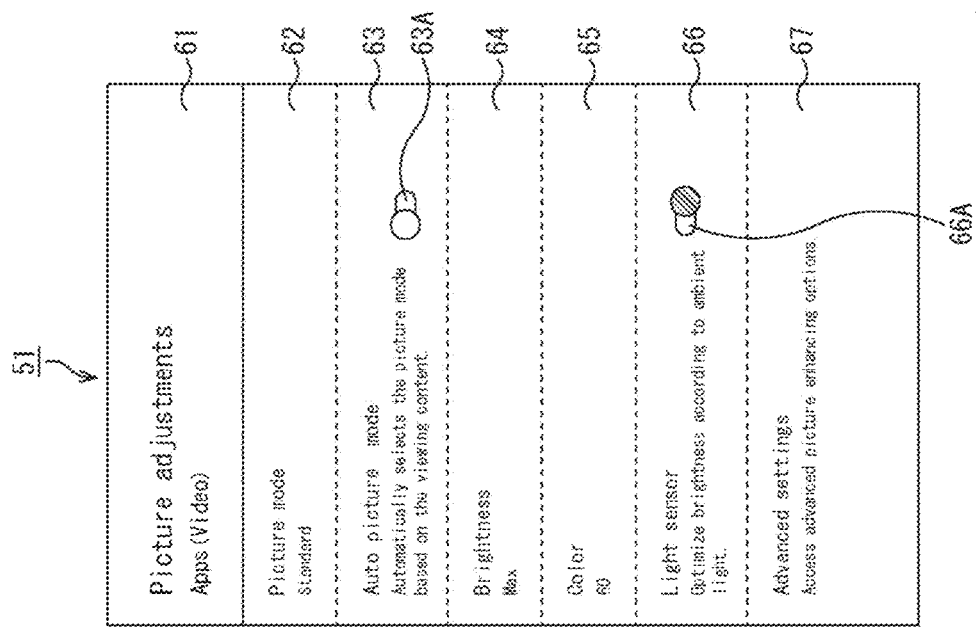
FIG. 4 is an enlarged view showing the image quality adjustment menu of FIG. 3.

FIG. 4 is an enlarged view showing the image quality adjustment menu 51 of FIG. 3.

As shown in FIG. 4, in the image quality adjustment menu 51, individual items related to image quality adjustment are displayed vertically side by side. A broken line indicating a boundary of display areas of individual items is not a line actually displayed on the image quality adjustment menu 51.

In an area 61 in an upper part of the image quality adjustment menu 51, the characters "Picture adjustments" indicating the image quality adjustment menu are displayed, and "Apps (Video)" is displayed below. The "Apps (Video)" indicates that the running application is a video application.

In this way, information indicating the running application is displayed in the area 61. For example, in a case where the TV viewing application 12-1 is running and broadcast programing is being viewed, "Apps (Tuner)" indicating that the TV viewing application 12-1 is running is displayed.

Areas 62 to 67 are sequentially formed below the area 61. To the areas 62 to 67, items related to image quality adjustment are assigned. The user can operate the remote controller 4 to select a predetermined item to change setting of the selected item.

The area 62 is an area used for setting of Picture mode. The Picture mode is an overall image quality adjustment mode. In the example of FIG. 4, "Standard" is set.

Figure 5:
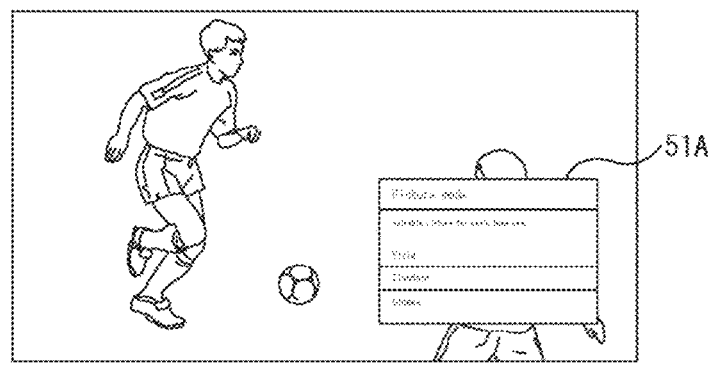
FIG. 5 is a view showing a display example of a selection menu in Picture mode.

For example, in a case where the item "Picture mode" is selected, as shown in FIG. 5, a selection menu 51A of the Picture mode is displayed instead of the image quality adjustment menu 51. In the example of FIG. 5, "Vivid", "Standard", and "Cinema" are displayed as setting values of the Picture mode. The user operates the remote controller 4 and selects a predetermined setting value from the setting values displayed on the selection menu 51A.

Returning to the description of FIG. 4, the area 63 is an area used for setting of Auto picture mode. The Auto picture mode is a function of automatically switching the image quality in accordance with a content being viewed. In the area 63, a switch 63A indicating on/off of the Auto picture mode is displayed. The user can select the item "Auto picture mode" to change on/off setting of the Auto picture mode. Here, on/off of the Auto picture mode is displayed in the area 63, but the "Auto picture mode" may be displayed and selected together with "Vivid", "Standard", and "Cinema" as the setting values of the Picture mode.

The area 64 is an area used for setting of Brightness. The Brightness represents luminosity (brightness). In the example of FIG. 4, a setting value "Max" is set. The user can select the item "Brightness" to change the luminosity setting.

The area 65 is an area used for setting of Color. The Color represents hue. In the example of FIG. 4, a setting value "60" is set. The user can select the item "Color" to change setting of hue.

The area 66 is an area used for setting of Light sensor. The Light sensor is a function of automatically adjusting screen luminosity in accordance with ambient luminosity. In the area 66, a switch 66A that represents on/off of the Light sensor is displayed.

The user can select the item "Light sensor" to change on/off setting of the Light sensor function. In the example shown in FIG. 4, the Light sensor function is on and the switch 66A is displayed in a bright color. A hatched indication shows that the switch 66A is displayed in a bright color.

The area 67 is an area used for detailed setting. The user can select the item of detailed setting to change multiple detailed setting related to image quality.

While viewing of recorded programing or broadcast programing, the image quality is adjusted using the image quality adjustment menu 51 as described above.

While viewing of a content provided by a distribution service other than the distribution service A, which is a specific distribution service, the image quality is also adjusted by using a similar image quality adjustment menu 51.

For example, in a case where an instruction is made to perform image quality adjustment while viewing of a content provided by the distribution service B, for example, "Service B app" indicating that the running application is the content viewing application 12-B is displayed in the area 61. Furthermore, in a case where an instruction is made to perform image quality adjustment while viewing of a content provided by the distribution service N, for example, "Service N app" indicating that the running application is the content viewing application 12-N is displayed in the area 61.

Example of During Content Viewing of Specific Distribution Service

Figure 6:
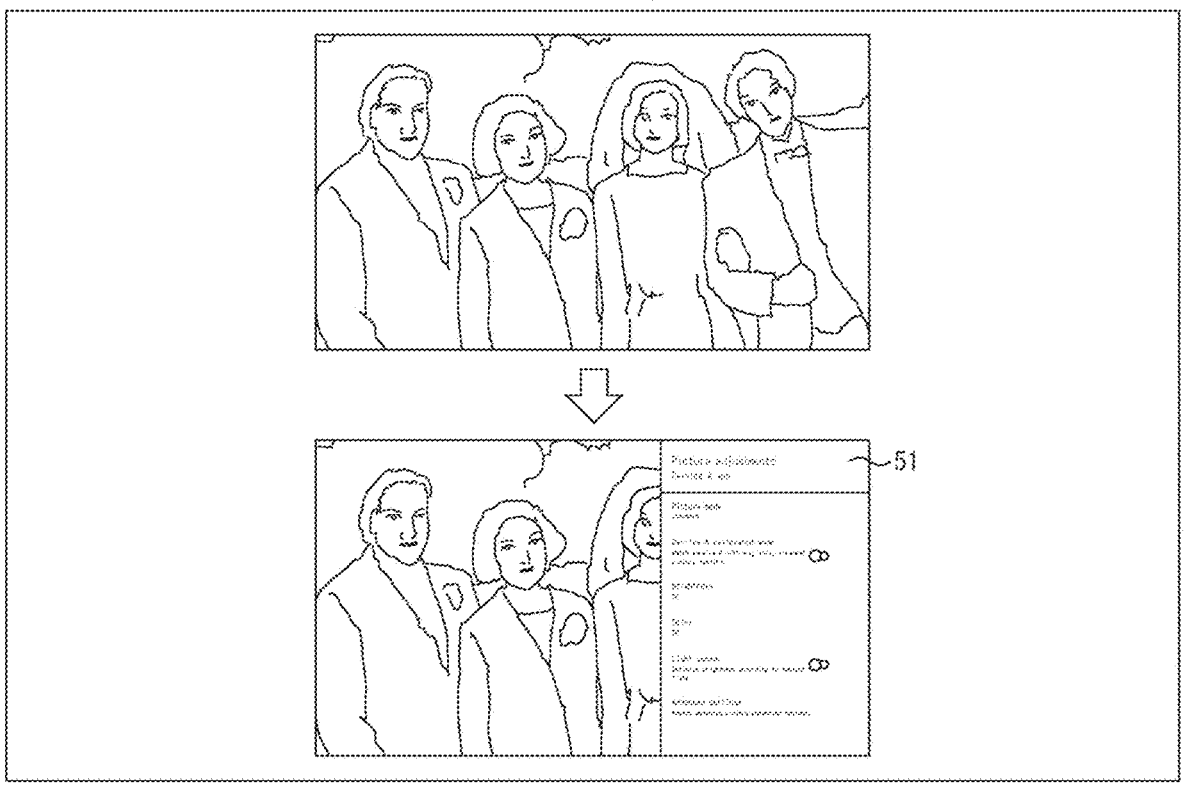
FIG. 6 is a view showing another display example of the image quality adjustment menu.

FIG. 6 is a view showing a display example of the image quality adjustment menu during content viewing of the distribution service A.

A content shown in an upper part of FIG. 6 is, for example, a movie provided by the distribution service A. A content selected by the user is reproduced by the content viewing application 12-A, and a video image of the content is displayed on the display device.

In a case where an instruction is made to perform image quality adjustment while the screen as shown in the upper part of FIG. 6 is displayed, the image quality adjustment menu 51 is displayed at a right edge of the screen, as shown at a tip of the arrow. In an area other than the display area of the image quality adjustment menu 51 in the entire screen, the video image of the content continues to be displayed.

Figure 7:
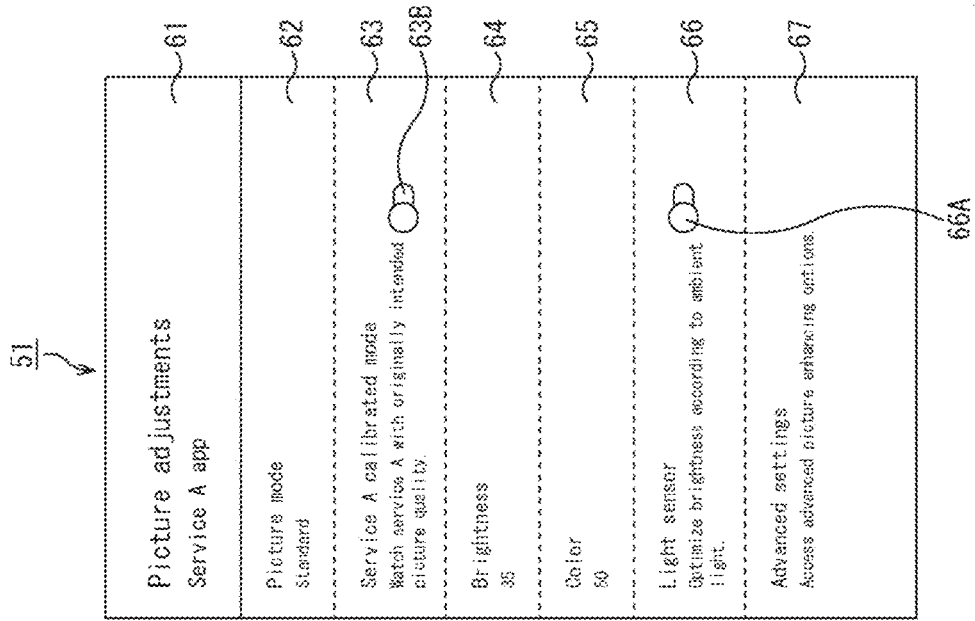
FIG. 7 is an enlarged view showing the image quality adjustment menu of FIG. 6.

FIG. 7 is an enlarged view showing the image quality adjustment menu 51 of FIG. 6.

In display of the image quality adjustment menu 51 shown in FIG. 7, the same display as that described with reference to FIG. 4 is denoted by the same reference numeral. Redundant descriptions will be omitted as appropriate.

As shown in FIG. 7, "Service A app" indicating that the running application is the content viewing application 12-A is displayed in the area 61.

In the image quality adjustment menu 51 of FIG. 7, the area 63 is an area used for setting of Service A calibrated mode. That is, the area 63 becomes an area for the Service A calibrated mode, instead of the Auto picture mode. In the area 63, a switch 63B indicating on/off of the Service A calibrated mode is displayed.

The Service A calibrated mode is an image quality adjustment mode for the distribution service A.

In a case where the Service A calibrated mode is on, image quality adjustment of a content of the distribution service A is performed in accordance with image quality adjustment parameters set for the distribution service A. For example, image quality adjustment with the Service A calibrated mode is performed by using image quality adjustment parameters common to all the contents distributed by the distribution service A.

The image quality adjustment parameters for the distribution service A are preset and managed by the content viewing application 12-A. The image quality adjustment parameters for the distribution service A may be acquired from the distribution server 2-1 at a timing when the Service A calibrated mode is set to on.

Whereas, in a case where the Service A calibrated mode is off, the image quality adjustment of a content of the distribution service A is performed in accordance with image quality adjustment parameters set by the user using display of other areas including the Picture mode. The Picture mode can also be used for image quality adjustment of the content of the distribution service A in a case where the Service A calibrated mode is off, in addition to image quality adjustment of programing and image quality adjustment of contents of distribution services other than the distribution service A.

In the example shown in FIG. 7, the Service A calibrated mode is set to off. For example, default setting for the Service A calibrated mode is off.

Items in other areas are the same as those described with reference to FIG. 4.

In the example of FIG. 7, the Brightness of the area 64 is set to "35", and the Color of the area 65 is set to "50". Furthermore, setting of the Light sensor in the area 66 is turned off.

Figure 8:
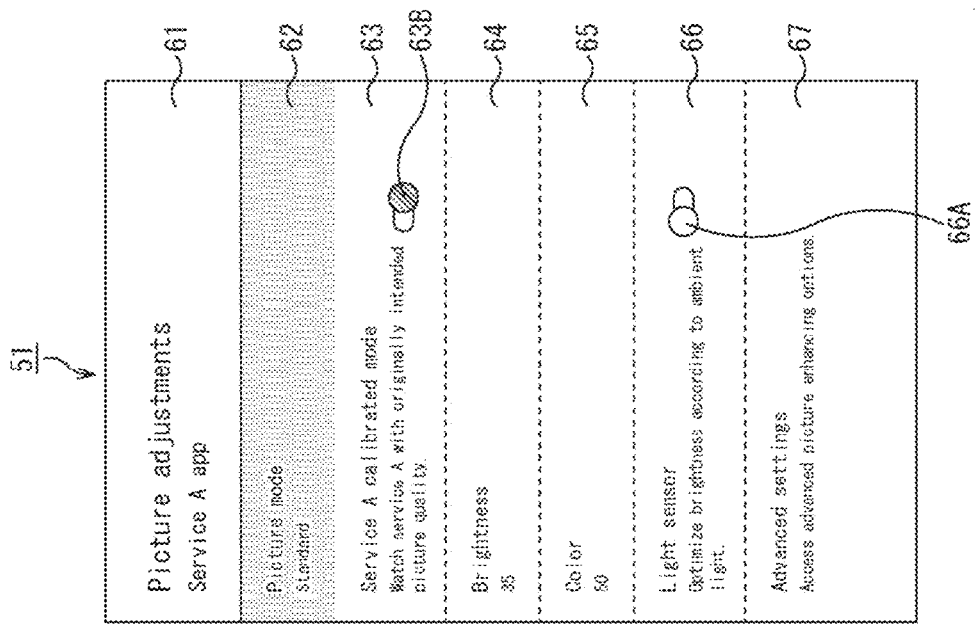
FIG. 8 is an enlarged view showing the image quality adjustment menu of FIG. 6.

FIG. 8 is a view showing a display example of the image quality adjustment menu 51.

In a case where the Service A calibrated mode is set to on, the area 62 is displayed to be grayed out to indicate an inoperable state. That is, it is prohibited to change the setting of the Picture mode. As the image quality adjustment mode, setting of the Service A calibrated mode has priority over setting of the Picture mode.

In the example of FIG. 8, the switch 63B in the area 63 is on, and the switch 63B is displayed in a prominent color.

Figure 9:
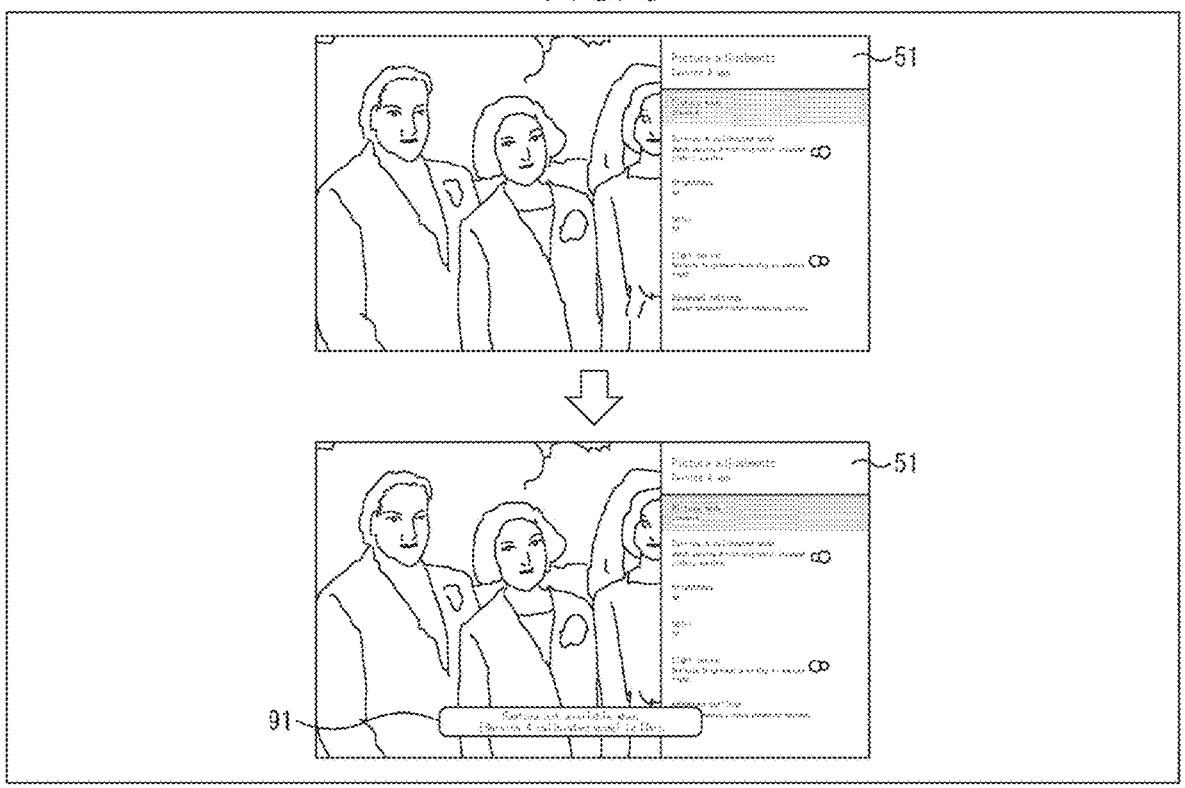
FIG. 9 is a view showing an example of switching display of the image quality adjustment menu.

FIG. 9 is a view showing a display example of the image quality adjustment menu 51 in a case where the Service A calibrated mode has been set to on.

In a case where the Service A calibrated mode has been set to on, the Picture mode is displayed to be grayed out as shown in an upper part of FIG. 9. In this state, in a case where the user operates the remote controller 4 to select the area 62 of the Picture mode, a message 91 is displayed notifying that a change of the Picture mode is prohibited, as shown at a tip of the arrow.

In a case of changing the Picture mode, the user switches setting of the Service A calibrated mode to off, and thereafter, changes the Picture mode.

Returning to the description of FIG. 8, the Brightness of the area 64 is set to "40", and the Color of the area 65 is set to "70". Setting of these Brightness and Color is setting based on the image quality adjustment parameters for the distribution service A. Other items included in the detailed setting are also set as appropriate on the basis of the image quality adjustment parameters for the distribution service A.

Even in a case where the Service A calibrated mode has been set to on, items other than the Picture mode are displayed in an operable state. The user can change setting for the items other than the Picture mode.

In this way, the TV 1 is provided with the Service A calibrated mode, which is an image quality adjustment mode for the distribution service A.

Image quality adjustment parameters of the Service A calibrated mode are, for example, parameters prepared by a business operator of the distribution service A. For contents of the distribution service A, image quality adjustment intended by the business operator of the distribution service A is applied.

The business operator of the distribution service A can allow the user to view a video image with image quality intended by the business operator side.

Also as the user, it is possible to view the video image of the content with the image quality intended by the business operator side.

Processing of the TV 1 to perform the image quality adjustment as described above will be described later with reference to a flowchart.

<Configuration and Operation of TV>

Configuration of TV

Figure 10:
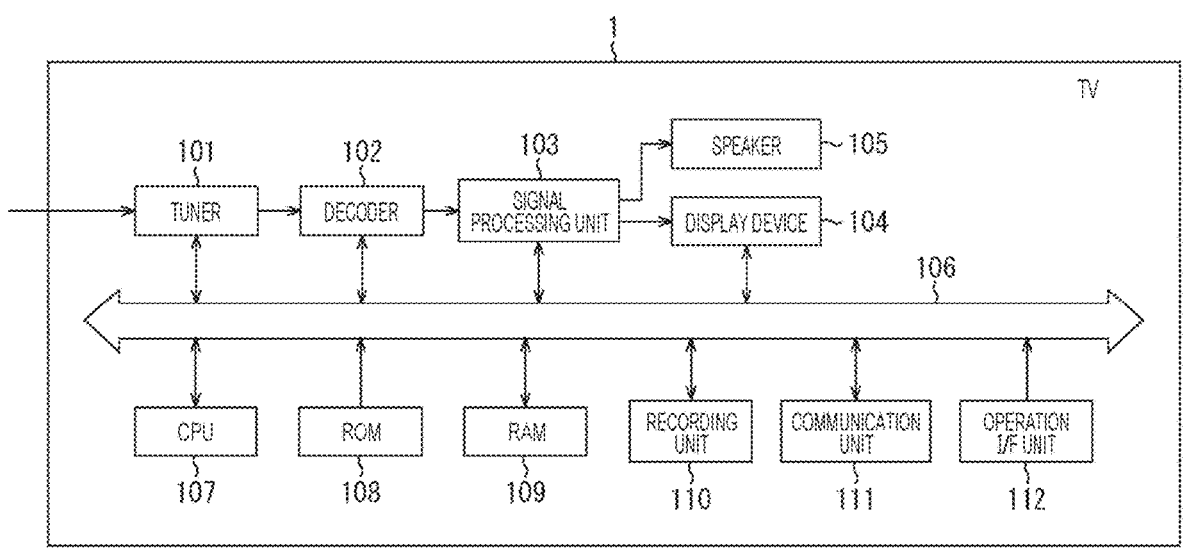
FIG. 10 is a block diagram showing a hardware configuration example of the TV.

FIG. 10 is a block diagram showing a hardware configuration example of the TV 1.

A tuner 101 receives a broadcast wave signal supplied from an antenna (not shown) or a broadcast wave signal supplied from a satellite broadcast or cable TV set-top box, and extracts a signal of a channel selected by the user. The tuner 101 performs various processes such as A/D conversion and demodulation on the extracted signal, and outputs programing data acquired by performing various processes, to a decoder 102.

The decoder 102 decodes a video stream included in the programing data, and outputs data of each picture obtained by decoding, to a signal processing unit 103. Furthermore, the decoder 102 decodes an audio stream included in the programing data, and outputs sound data of the programing to the signal processing unit 103.

In a case of reproducing a content of a predetermined distribution service, the decoder 102 decodes a video stream and an audio stream of a content received by a communication unit 111 and supplied via a bus 106. The decoder 102 outputs data of each picture obtained by decoding the video stream of the content and sound data obtained by decoding the audio stream, to the signal processing unit 103.

The signal processing unit 103 performs image quality adjustment of each picture supplied from the decoder 102 in accordance with control by a CPU 107. The signal processing unit 103 outputs a picture after the image quality adjustment to a display device 104, and controls to display a video image of the programing or the content.

Furthermore, the signal processing unit 103 performs D/A conversion and the like of sound data supplied from the decoder 102, synchronizes with the video image, and outputs sound of the programing or the content from a speaker 105.

The display device 104 is a display having 4K resolution pixels and supporting HDR video image display. The display device 104 includes a liquid crystal display (LCD), an organic EL display, or the like.

The central processing unit (CPU) 107, a read only memory (ROM) 108, and a random access memory (RAM) 109 are mutually connected by the bus 106. The CPU 107 executes a program recorded in the ROM 108 or a recording unit 110 by using the RAM 109, and controls the entire TV 1.

The recording unit 110 includes a recording medium such as a hard disk drive (HDD) or a solid state drive (SSD). The recording unit 110 records various data such as programing data, contents, EPG data, and programs.

The communication unit 111 is an interface of the network 3. The communication unit 111 communicates with the distribution server 2.

An operation I/F unit 112 receives a command transmitted from the remote controller 4 and outputs to the CPU 107 via the bus 106.

Figure 11:
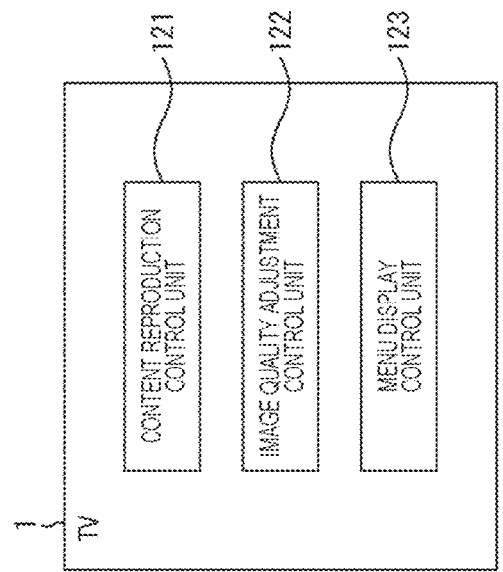
FIG. 11 is a block diagram showing a functional configuration example of the TV.

FIG. 11 is a block diagram showing a functional configuration example of the TV 1.

As shown in FIG. 11, in the TV 1, a content reproduction control unit 121, an image quality adjustment control unit 122, and a menu display control unit 123 are realized.

At least a part of functional units shown in FIG. 11 is realized by executing a predetermined program by the CPU 107 of FIG. 10. For example, the content reproduction control unit 121 is realized by executing the content viewing application 12-A. The image quality adjustment control unit 122 and the menu display control unit 123 are realized by executing the image quality adjustment application 12-3.

The content reproduction control unit 121 communicates with the distribution server 2-1 by controlling the communication unit 111, and requests the distribution server 2-1 to transmit a content selected by the user. The content reproduction control unit 121 controls the decoder 102 to reproduce the content transmitted from the distribution server 2-1.

The image quality adjustment control unit 122 controls image quality adjustment of programing or contents performed by the signal processing unit 103.

For example, in a case of reproducing a content of the distribution service A, which is the specific distribution service, the image quality adjustment control unit 122 controls to perform image quality adjustment in accordance with image quality adjustment parameters for the distribution service A, in a case where the Service A calibrated mode has been set to on. The image quality adjustment parameters for the distribution service A include, for example, a set of a plurality of parameters representing setting values of a plurality of items.

Furthermore, at a time of reproducing programing, or of reproducing a content of a distribution service other than the distribution service A, the image quality adjustment control unit 122 controls to perform image quality adjustment in accordance with image quality adjustment parameters individually set by the user.

The menu display control unit 123 causes the display device 104 to display the image quality adjustment menu, in a case where an instruction is made to perform image quality adjustment. Furthermore, the menu display control unit 123 switches display of the image quality adjustment menu in accordance with a user's operation as described above.

Operation of TV

Here, with reference to a flowchart in FIG. 12, an image quality adjustment process of the TV 1 will be described.

Figure 12:
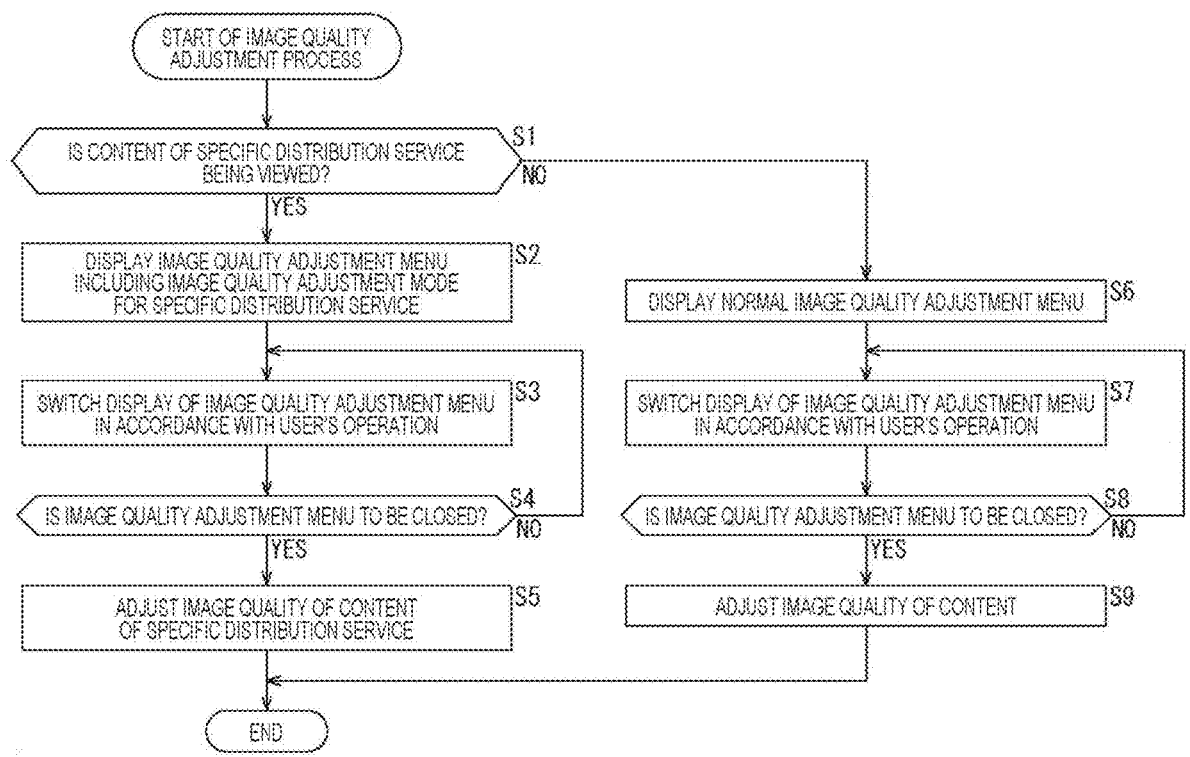
FIG. 12 is a flowchart for explaining an image quality adjustment process.

The process of FIG. 12 is started, for example, when the user instructs performing of image quality adjustment.

In step S10, the menu display control unit 123 determines whether or not a content of the distribution service A, which is the specific distribution service, is being viewed.

In a case where it is determined in step S1 that the content of the distribution service A is being viewed, in step S2, the menu display control unit 123 controls to display the image quality adjustment menu (FIG. 7) including the item of the Service A calibrated mode, which is an image quality adjustment mode for the distribution service A.

In step S3, the menu display control unit 123 switches display of the image quality adjustment menu as described above in accordance with a user's operation.

In step S4, the menu display control unit 123 determines whether or not to close the image quality adjustment menu. When the image quality adjustment menu is to be closed, the process returns to step S3, and display of the image quality adjustment menu continues until the determination is made in step S4.

In a case where it is determined in step S4 that the image quality adjustment menu is to be closed, in step S5, the image quality adjustment control unit 122 controls image quality adjustment of the content of the distribution service A, and controls to display a video image after the image quality adjustment. For example, in a case where the Service A calibrated mode is set to on with use of the image quality adjustment menu, the image quality adjustment control unit 122 controls to perform the image quality adjustment in accordance with the image quality adjustment parameters for the distribution service A.

Whereas, in a case where it is determined in step S1 that the content of the distribution service A is not being viewed, in step S6, the menu display control unit 123 controls to display the normal image quality adjustment menu (FIG. 4). The image quality adjustment menu displayed here does not include the item of the Service A calibrated mode.

In step S7, the menu display control unit 123 switches display of the normal image quality adjustment menu in accordance with a user's operation.

In step S8, the menu display control unit 123 determines whether or not to close the normal image quality adjustment menu. When the normal image quality adjustment menu is to be closed, the process returns to step S7, and display of the normal image quality adjustment menu continues until the determination is made in step S8.

In a case where it is determined in step S8 that the normal image quality adjustment menu is to be closed, in step S9, the image quality adjustment control unit 122 controls the image quality adjustment of programing or a content in accordance with setting by the user, and controls to display a video image after the image quality adjustment.

After the image quality adjustment is performed in step S5 or step S9, the process ends.

By the process described above, the business operator of the distribution service A can allow the user to view a video image with image quality intended by the business operator side. Furthermore, the user can view the video image of the content with the image quality intended by the business operator side.

Note that the content distributed by the distribution service A may be a content in which an SDR video image is recorded, or may be a content in which an HDR video image is recorded. The maximum brightness of the SDR video image is 100 nits (100 $cd/m^2$), while the maximum brightness of the HDR video image exceeds that, for example, 10000 nits.

In a case where the display device 104 of the TV 1 is a display that supports HDR video image display as described above, a range of adjustment is wide. Therefore, there is a possibility that the user performs image quality adjustment different from the one intended by the business operator side. It is considered that preparing the Service A calibrated mode, which is the image quality adjustment mode for the distribution service A, is particularly effective at a time of displaying the content containing the HDR video image.

Modified Example

Setting Example of Image Quality Adjustment Parameter

It has been assumed that the image quality adjustment parameters used in a case where the Service A calibrated mode is set to on are the image quality adjustment parameters common to all the contents distributed by the distribution service A. However, the image quality adjustment parameters may be prepared for each content. In this case, the image quality adjustment parameters are prepared by, for example, a creator of the content, and are managed by the distribution server 2-1.

An image quality adjustment process in a case where the image quality adjustment parameters are prepared for each content will be described with reference to a flowchart of FIG. 13.

Figure 13:
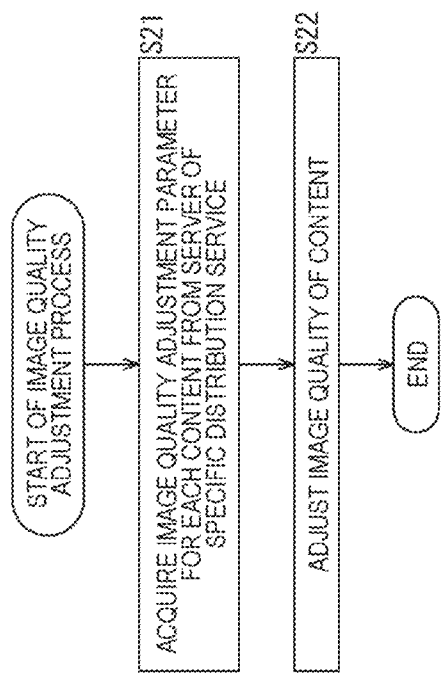
FIG. 13 is a flowchart for explaining another image quality adjustment process.

The process of FIG. 13 is started, for example, when the Service A calibrated mode is set to on.

In step S21, the image quality adjustment control unit 122 communicates with the distribution server 2-1, which is a server of the specific distribution service, and acquires image quality adjustment parameters for a content to be reproduced.

In step S22, the image quality adjustment control unit 122 causes the signal processing unit 103 to perform image quality adjustment of the content in accordance with the image quality adjustment parameters acquired from the distribution server 2-1.

Therefore, the creator of the content distributed by the distribution service A can allow the user to view a video image with image quality intended by the creator side.

The image quality adjustment parameters may be prepared for each genre of contents distributed by the distribution service A, or may be prepared for each model of the TV 1. Furthermore, the image quality adjustment parameters may be prepared for each display performance of the display device 104 included in the TV 1.

Example of Device

Figure 14:
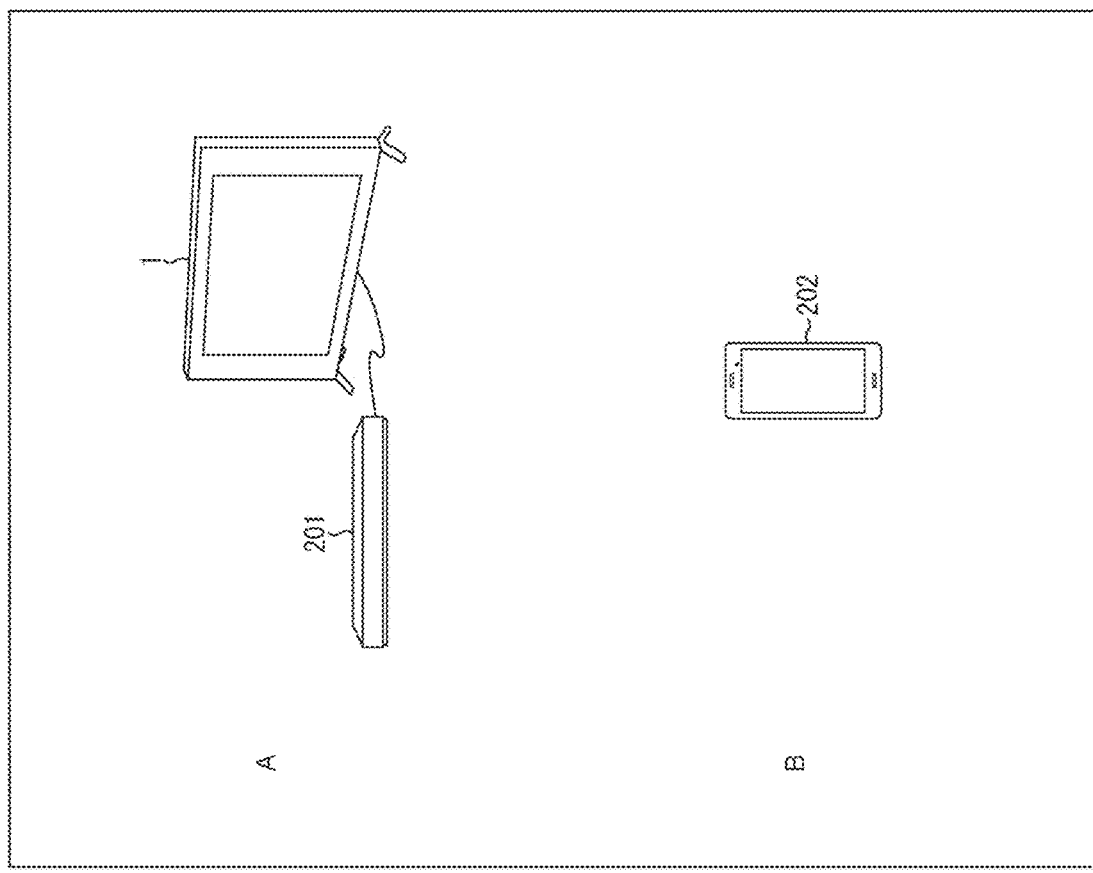
FIG. 14 is a view showing an example of a device.

The image quality adjustment as described above by the TV 1 may be performed on reproduction equipment 201 shown in A of FIG. 14 or a mobile terminal 202 shown in B of FIG. 14. The reproduction equipment 201 is a device such as a set-top box or equipment that supports reproduction of a predetermined package medium.

For example, in a case where the Service A calibrated mode has been set to on, the reproduction equipment 201 performs image quality adjustment of contents on the basis of the image quality adjustment parameters for the distribution service A, and outputs a video image after the image quality adjustment to the TV 1 to be displayed.

Other Examples

As parameters for a specific distribution service, parameters used for image quality adjustment are prepared, but parameters used for sound quality adjustment of the sound of the content may also be prepared.

In a case where the Service A calibrated mode has been set to on, the TV 1 is to adjust sound of a content on the basis of the parameters for the distribution service A, and output sound after the sound quality adjustment.

<Example of Case where there are Multiple Specific Distribution Services>

A description has been given to a case where the specific distribution service is one, which is the distribution service A, but multiple distribution services may be prepared as the specific distribution services.

In this case, the user can use an image quality adjustment function similar to the Service A calibrated mode described above not only for viewing the distribution service A but also for viewing contents of other distribution services such as the distribution service B and a distribution service C.

Figure 15:
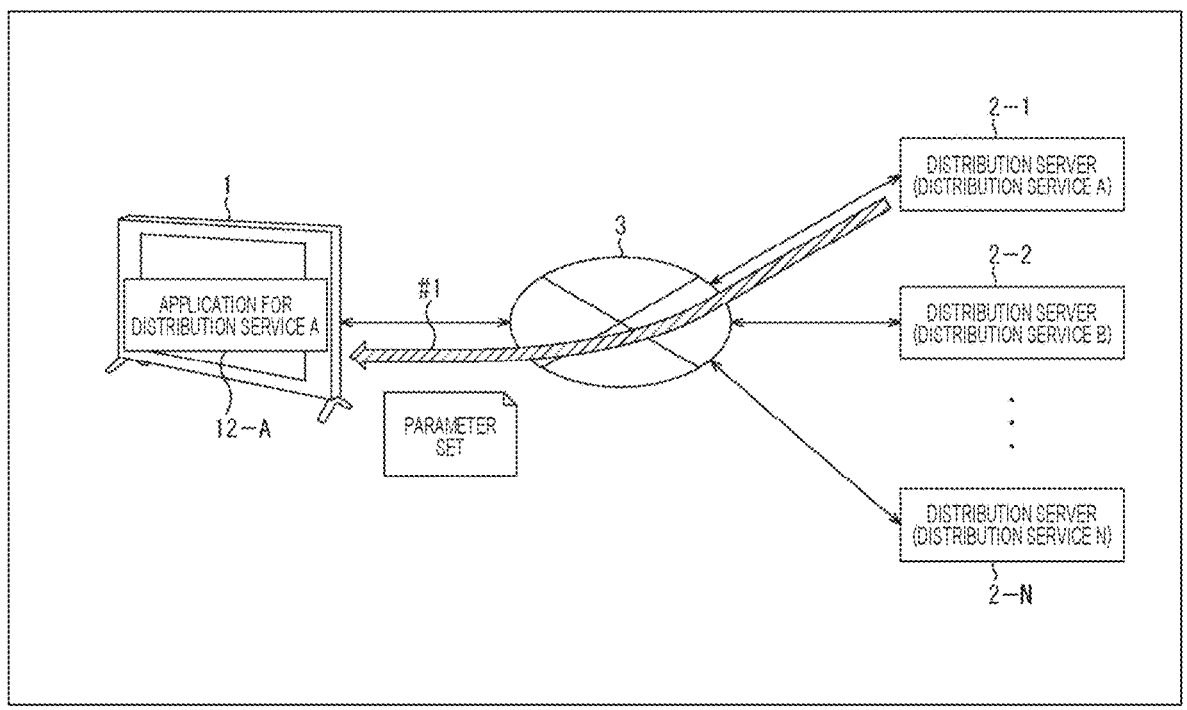
FIG. 15 is a diagram showing an example of providing image quality adjustment parameters.

FIG. 15 is a diagram showing an example of providing image quality adjustment parameters.

In a case where the content viewing application 12-A is running on the TV 1, communication is performed between the content viewing application 12-A and the distribution server 2-1, and the distribution server 2-1 provides the content viewing application 12-A with image quality adjustment parameters for the distribution service A, as shown by arrow #1.

The image quality adjustment parameters may be provided at a timing when the Service A calibrated mode is set to on as described above, or may be provided at any timing such as a timing when the distribution of the content is started.

In a case where the Service A calibrated mode has been set to on, image quality adjustment of a content of the distribution service A is performed on the basis of the image quality adjustment parameters provided by the distribution server 2-1. The acquisition of the image quality adjustment parameters and the image quality adjustment based on the image quality adjustment parameters are performed by, for example, the image quality adjustment control unit 122.

Such provision of image quality adjustment parameters is also performed by distribution servers that manage provision of other distribution services.

Figure 16:
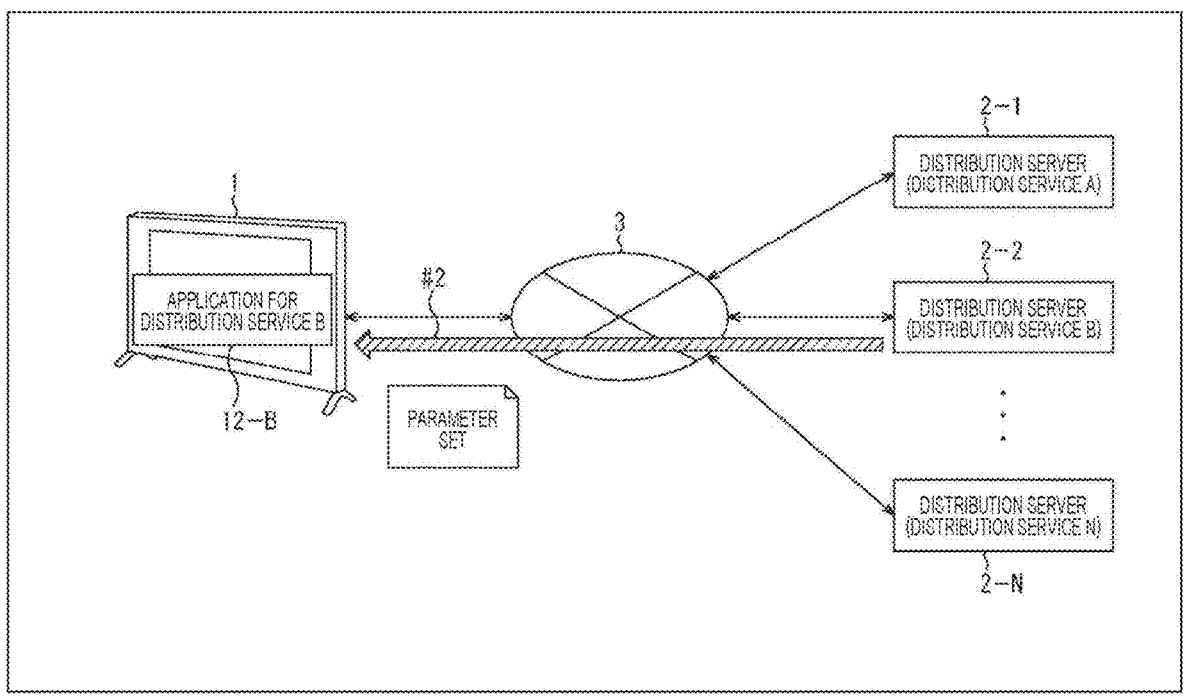
FIG. 16 is a diagram showing another example of providing image quality adjustment parameters.

FIG. 16 is a diagram showing another example of providing image quality adjustment parameters.

For example, in a case where an image quality adjustment mode for the distribution service B has been prepared, image quality adjustment parameters to be used in the image quality adjustment mode for the distribution service B are provided by the distribution server 2-2 that manages provision of the distribution service B.

That is, communication is performed between the content viewing application 12-B (FIG. 2) running on the TV 1 and the distribution server 2-2, and the distribution server 2-2 provides the content viewing application 12-B with image quality adjustment parameters for the distribution service B, as shown by arrow #2.

The image quality adjustment parameters for the distribution service B are also provided at any timing such as a timing when the image quality adjustment mode for the distribution service B is set to on, or a timing when the content distribution is started.

In a case where the image quality adjustment mode for the distribution service B has been set to on, image quality adjustment of a content of the distribution service B is performed on the basis of the image quality adjustment parameters provided by the distribution server 2-2.

In a case where image quality adjustment modes for multiple distribution services are prepared in this way, display of an image quality adjustment menu is different from display of the image quality adjustment menu 51 described with reference to FIG. 8 and the like.

About Screen Display

Figure 17:
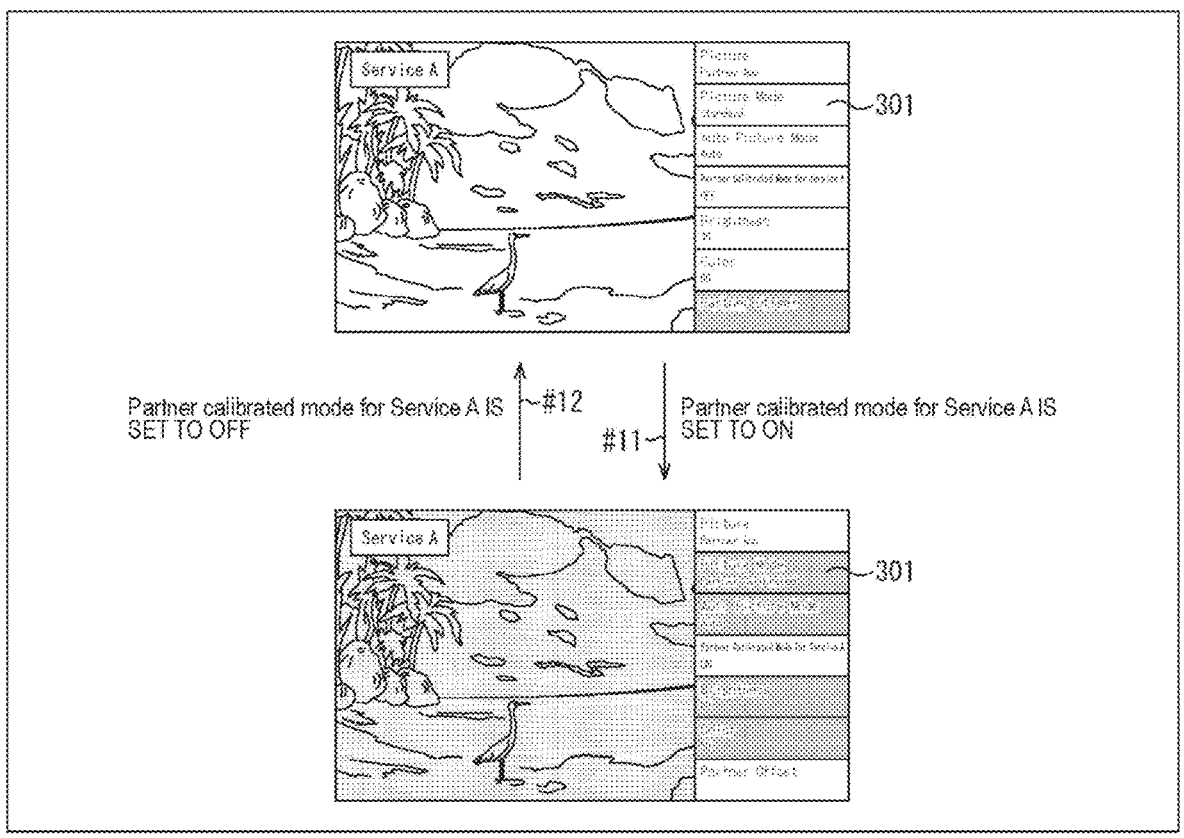
FIG. 17 is a view showing a display example of the image quality adjustment menu.

FIG. 17 is a view showing a display example of an image quality adjustment menu.

In a case where an instruction is made to perform image quality adjustment while viewing of the content of the distribution service A, an image quality adjustment menu 301 is displayed at a right edge of the screen, as shown in an upper part of FIG. 17. In an area other than the display area of the image quality adjustment menu 301 in the entire screen, a video image of the content of the distribution service A continues to be displayed.

In the image quality adjustment menu 301, items similar to those of the image quality adjustment menu 51 described above are displayed vertically side by side. Redundant descriptions will be omitted as appropriate.

Figure 18:
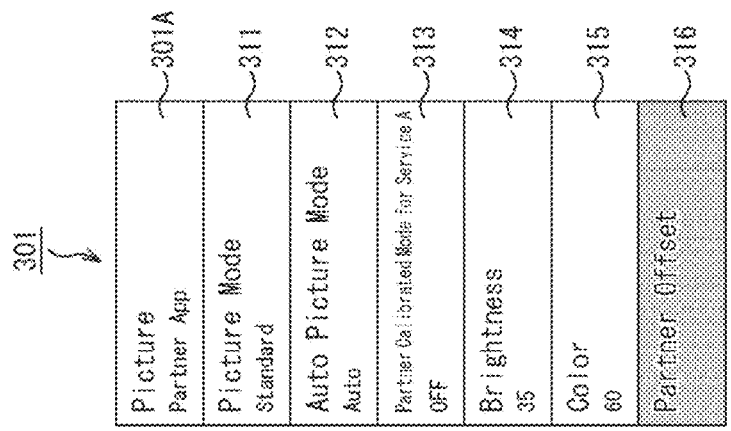
FIG. 18 is an enlarged view showing an image quality adjustment menu.

FIG. 18 is an enlarged view showing the image quality adjustment menu 301 of FIG. 17.

An area 301A in an uppermost part is an area to display information indicating a type of input (input type) for the display device 104. In the example of FIG. 18, the input type is "Partner App".

The "Partner App" indicates that an application for using a distribution service for which a dedicated image quality adjustment mode is prepared is being executed, and a video image acquired by the application is displayed on the display device 104.

"Partner" is the business operator of the distribution service A, the business operator of the distribution service B, and the like for which a dedicated image quality adjustment mode has been prepared. Hereinafter, an image quality adjustment mode dedicated to the "Partner" is referred to as "Partner calibrated mode" as appropriate.

Areas 311 to 316 below the area 301A are areas to be used for a user's operation. To the areas 311 to 316, items related to image quality adjustment are assigned. The user can operate the remote controller 4 to select a predetermined item to change setting of the selected item.

The area 311 is an area used for setting of the Picture mode. In the example of FIG. 18, "Standard" is set as the Picture mode.

The area 312 is an area used for setting of the Auto picture mode.

Display of the area 311 and the area 312 is individually the same as display of the area 62 and the area 63 described with reference to, for example, FIG. 4.

The area 313 is an area used for setting of the Partner calibrated mode, which is an image quality adjustment mode dedicated to "Partner". Since a content of the distribution service A is being viewed, the characters "Partner calibrated mode for Service A" are displayed in the area 313 of FIG. 18. The "Partner calibrated mode for Service A" is the same as the Partner calibrated mode of the distribution service A, that is, the Service A calibrated mode described above.

Note that, in the example of FIG. 18, setting of the Partner calibrated mode is turned off. Default setting of the Partner calibrated mode is, for example, off.

In a case where the user selects the area 313 by operating the remote controller 4, it becomes possible to select on/off of the Partner calibrated mode.

The area 314 is an area used for setting of the Brightness as an image quality adjustment parameter. In the example of FIG. 18, a setting value "35" is set.

The area 315 is an area used for setting of the Color as an image quality adjustment parameter. In the example of FIG. 18, a setting value "60" is set.

Display of the area 314 and the area 315 is individually the same as display of the area 64 and the area 65 described with reference to, for example, FIG. 8. In a case where the Partner calibrated mode is off, the user can freely set the image quality adjustment parameters of the Brightness and the Color.

The area 316 is an area used for setting of Partner Offset. The Partner Offset is Offset used for image quality adjustment in a case where the Partner calibrated mode has been set to on. Using an Offset value set as the Partner Offset enables further adjustment to be made to the image quality adjustment, with the image quality adjustment parameters set with the Partner calibrated mode.

That is, by setting the Partner Offset, the user can also view a video image with image quality finely adjusted in accordance with user's preference, rather than an original video image as it is of the Partner calibrated mode (a video image after image quality adjustment with use of the image quality adjustment parameters provided by the distribution service).

The area 316 is displayed to be grayed out in a case where the Partner calibrated mode has been set to off, as shown in FIG. 18. In this case, setting of the Partner Offset is disabled.

In FIG. 18, the fact that the area 316 is colored indicates that the area 316 is displayed to be grayed out. The areas 311 to 315 that are not grayed out are areas that can be operated by the user.

With use of such display of the image quality adjustment menu 301, the user can perform image quality adjustment of a content of the distribution service A.

Returning to the description in FIG. 17, in a case where the Partner calibrated mode (the Partner calibrated mode for Service A) is set to on, as shown at a tip of arrow #11, a video image of the content is switched to a video image after image quality adjustment with the Partner calibrated mode. Image quality adjustment using parameters provided by the distribution service A, as image quality adjustment parameters such as the Brightness and the Color, is performed on the content. In the example of FIG. 17, setting values of "60" as the Brightness and "50" as the Color are used as the image quality adjustment parameters of the Partner calibrated mode.

In the image quality adjustment menu 301, among the areas 311 to 316, only the area 313 of the Partner calibrated mode and the area 316 of the Partner Offset are operable, and other areas are displayed to be grayed out.

In the image quality adjustment menu 301 in a lower part of FIG. 17, setting of the Partner calibrated mode of the area 313 has been turned on. Furthermore, the setting of the Picture mode of the area 311 is "Partner calibrated" indicating that the Partner calibrated mode has priority.

In this state, in a case where the Partner calibrated mode is set to off, as shown at a tip of arrow #12, a video image of the content is switched to a video image that has not been subjected to the image quality adjustment with the Partner calibrated mode. Display of the image quality adjustment menu 301 will also return to display in an off state before the Partner calibrated mode has been set to on.

Figure 19:
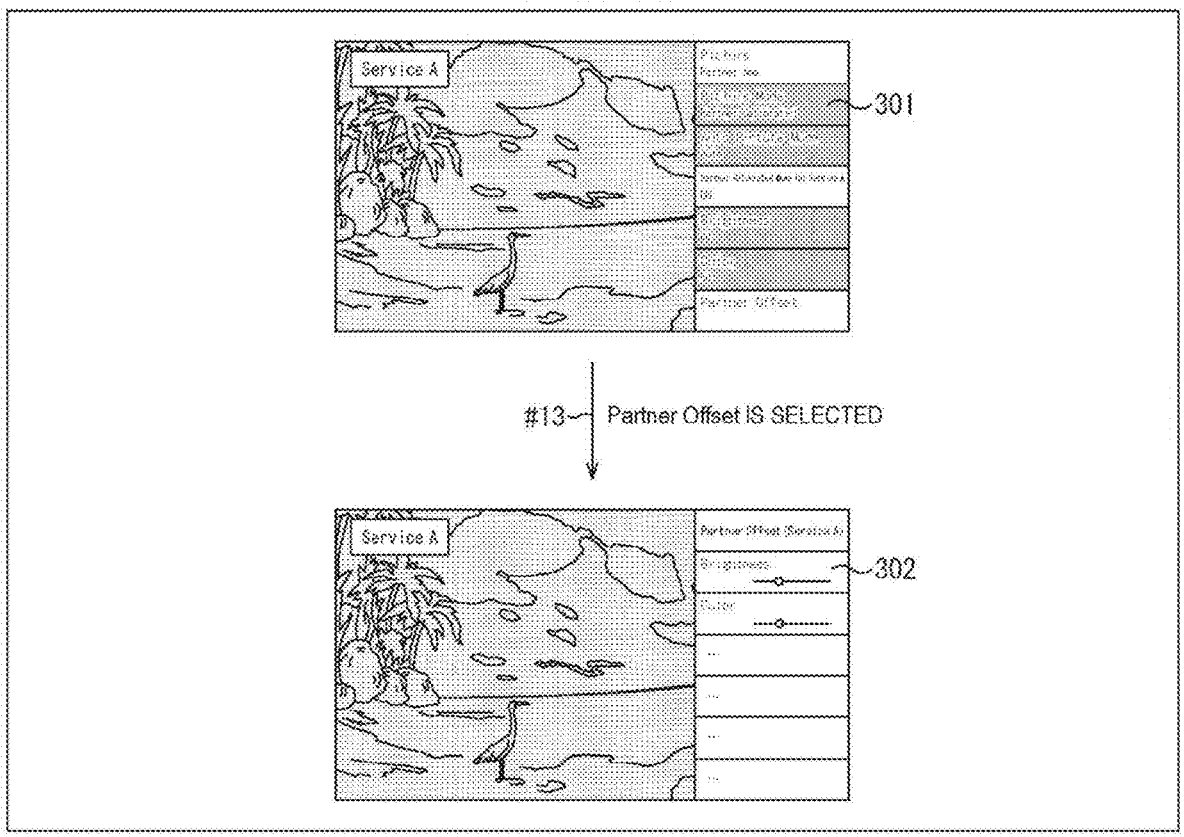
FIG. 19 is a view showing a display example when Partner Offset is set.

FIG. 19 is a view showing a display example when the Partner Offset is set.

As shown in an upper part of FIG. 19, in a case where the Partner calibrated mode is on, when selection is made to set the Partner Offset in a bottom column of the image quality adjustment menu 301, an Offset menu 302 is displayed instead of the image quality adjustment menu 301, as shown at a tip of arrow #13. The Offset menu 302 is display to be used for setting of the Partner Offset.

Figure 20:
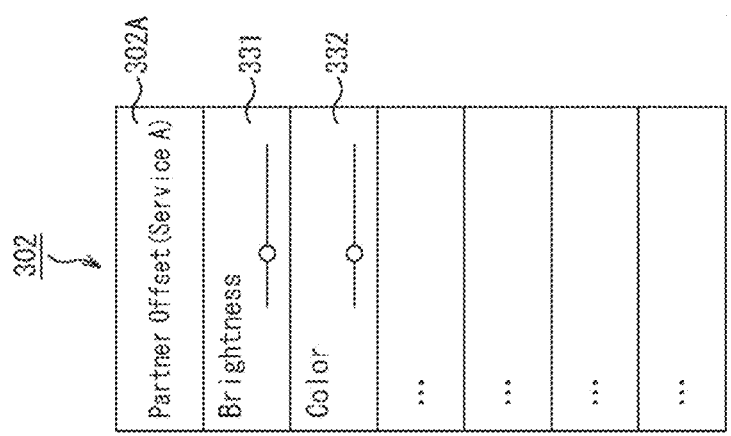
FIG. 20 is an enlarged view showing an Offset menu.

FIG. 20 is an enlarged view showing the Offset menu 302.

In an area 302A in an uppermost part, the characters "Partner Offset (Service A)" indicating that the Offset menu 302 is a menu to be used for setting of the Partner Offset are displayed.

Areas 331 and 332 below the area 302A are areas to be used for a user's operation.

In the example of FIG. 20, the area 331 is an area used for setting of an Offset value of the Brightness. Furthermore, the area 332 is an area used for setting of an Offset value of the Color.

The user can set the Offset value of the Brightness by selecting the area 331. Furthermore, the user can set the Offset value of the Color by selecting the area 332.

Setting of the Offset value is performed by using options that use relative expressions with respect to a criterion, for example, such as selecting one of five levels, or selecting any level from +5/+3/−3/−5.

That is, the unit of the Offset value is different from the unit of the adjustment parameters such as the Brightness and the Color. As a value of the Offset value, absolute numerical values such as values indicating the Brightness and the Color ("35" and "60" in FIG. 18) are not used.

For example, in a case where "+5" is selected as the Offset value of the Brightness, a predetermined value corresponding to "+5" is added to "60", which is the Brightness specified with the Partner calibrated mode, and a value after the addition is used to adjust the Brightness.

After the Offset value is set, display is returned to a state of the upper part of FIG. 19, in which the image quality adjustment menu 301 is displayed.

Note that, in the example of FIG. 19, it is assumed that there are two Offset values that can be set with use of the Offset menu 302: the Offset value of the Brightness and the Offset value of the Color. However, the number of items displayed in the Offset menu 302 will be different for each the Partner calibrated mode. For example, in the Partner calibrated mode of the distribution service B (Partner calibrated mode for Service B), it is also possible to enable setting of Offset values of more types of image quality adjustment parameters.

Even while viewing the content of the distribution service B, various kinds of setting related to image quality adjustment, including setting of the Partner calibrated mode, are made using display similar to the display above.

Figure 21:
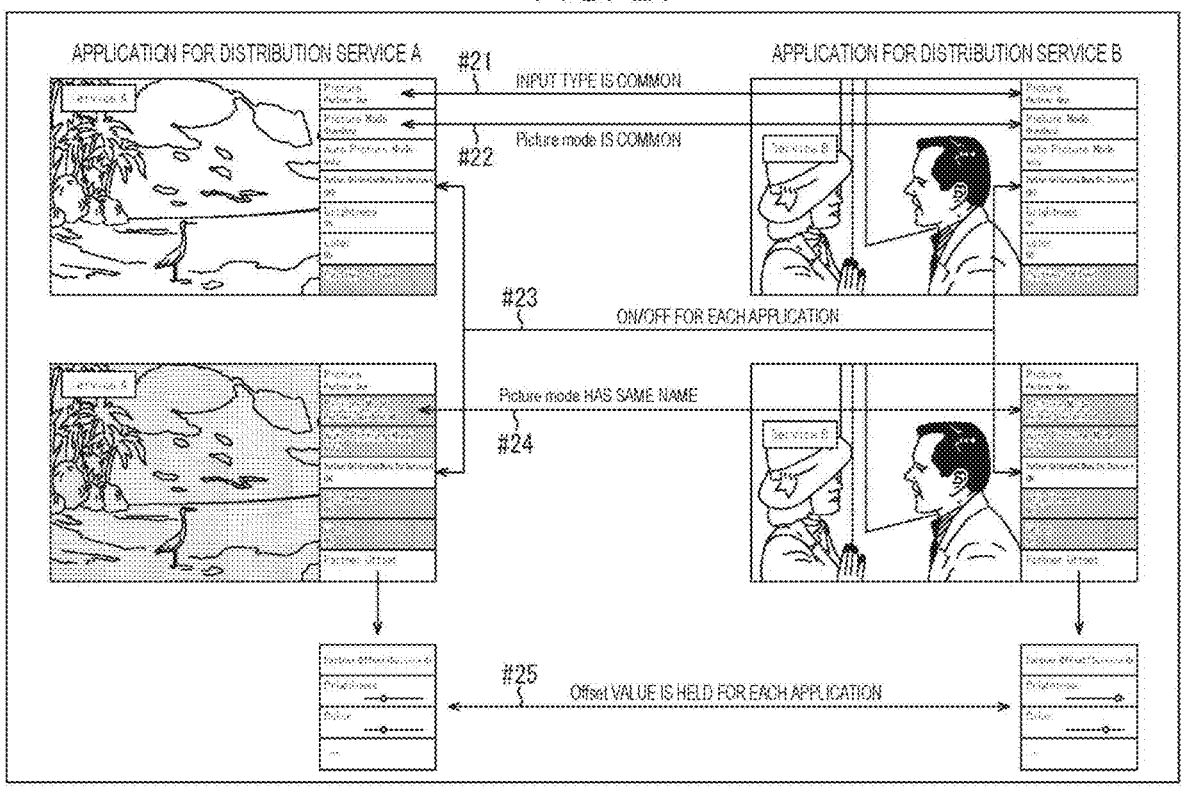
FIG. 21 is a view showing a display example of a screen for each distribution service.

FIG. 21 is a view showing a display example of a screen for each distribution service.

Display shown on a left side of FIG. 21 shows the screen display described above in a case where the content viewing application 12-A is running and a content of the distribution service A is being viewed. An upper part shows display in a case where the Partner calibrated mode for Service A is off, and a middle part shows display in a case where the Partner calibrated mode for Service A is on. A lower part shows display of the Offset menu 302.

Whereas, display shown on a right side of FIG. 21 shows screen display in a case where the content viewing application 12-B is running and a content of the distribution service B is being viewed. An upper part shows display in a case where the Partner calibrated mode for Service B is off, a middle part shows display in a case where the Partner calibrated mode for Service B is on. A lower part shows display of the Offset menu 302.

As shown by arrow #21, display of an input type of the image quality adjustment menu 301 is to be "Partner App" in common to both the case where the content viewing application 12-A is running and the case where the content viewing application 12-B is running.

As shown by arrows #22 and #24, display of the Picture mode in the image quality adjustment menu 301 is common in the case where the content viewing application 12-A is running and the case where the content viewing application 12-B is running. In a case where the Partner calibrated mode is off, a setting value such as "Standard" is displayed to indicate user's selection contents (arrow #22). In a case where the Partner calibrated mode is on, "Partner calibrated" is displayed to indicate that the Partner calibrated mode has priority (arrow #24).

As shown by arrow #23, the Partner calibrated mode can be individually set on/off for each of the content viewing application 12-A and the content viewing application 12-B.

As shown by arrow #25, setting of the Partner Offset with use of the Offset menu 302 can be individually held for each application of the content viewing application 12-A and the content viewing application 12-B. The Offset value of the Partner Offset set in a case where the Partner calibrated mode for Service A is on is used for image quality adjustment with the Partner calibrated mode for Service A. Furthermore, the Offset value of the Partner Offset set in a case where the Partner calibrated mode for Service B is on is used for image quality adjustment with the Partner calibrated mode for Service B.

As described above, for the case where the content viewing application 12-A is running and the case where the content viewing application 12-B is running, setting for image quality adjustment is made with use of similar user interfaces.

About Management of Image Quality Adjustment Parameters

Figure 22:
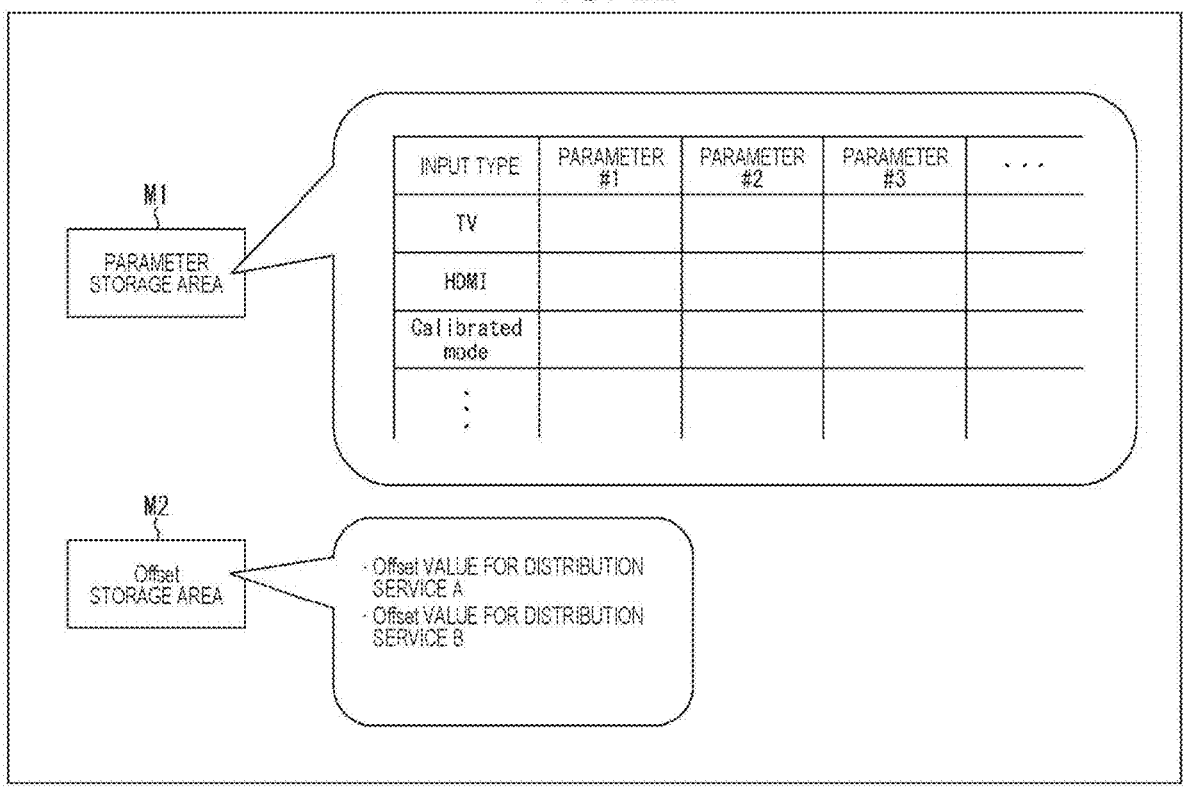
FIG. 22 is a view showing an example of management of image quality adjustment parameters.

FIG. 22 is a view showing an example of management of image quality adjustment parameters.

As shown in FIG. 22, the image quality adjustment parameters in the Partner calibrated mode are stored and managed in a parameter storage area M1 as table information, together with image quality adjustment parameters of other input types such as TV and HDMI (registered trademark).

Whereas, the Offset value of the Partner Offset is stored and managed in an Offset storage area M2, which is a storage area different from the parameter storage area M1, for each application.

For example, the parameter storage area M1 is formed in the RAM 109 (FIG. 10), which is a volatile storage area. The Offset storage area M2 is formed in the recording unit 110, which is a non-volatile storage area. The parameter storage area M1 and the Offset storage area M2 may be formed, for example, in the same non-volatile storage unit (medium).

The table information stored in the parameter storage area M1 is formed by associating multiple types of image quality adjustment parameters for each input type. In some image quality adjustment parameters, the same value is used commonly for multiple input types. Image quality adjustment parameters that are commonly used by multiple input types cannot be rewritten from content viewing applications such as the content viewing application 12-A and the content viewing application 12-B.

A Calibrated mode area, which is a storage area assigned to the Partner calibrated mode in the parameter storage area M1 is shared and used by a plurality of content viewing applications, for example.

For example, when the content viewing application 12-A is starting-up, default image quality adjustment parameters are written once in the Calibrated mode area. A set of image quality adjustment parameters for the Partner calibrated mode for Service A obtained from the distribution server 2-1 is written to the Calibrated mode area in a form of overwriting the default image quality adjustment parameters stored earlier.

In a case where the Partner calibrated mode for Service A is set to on, image quality adjustment is performed on the basis of the image quality adjustment parameters for the Partner calibrated mode for Service A written at a time of starting-up, and on the basis of the Offset value for the Partner calibrated mode for Service A stored in the Offset storage area M2.

Similarly, when the content viewing application 12-B is starting-up, the default image quality adjustment parameters are written once in the Calibrated mode area. A set of image quality adjustment parameters for the Partner calibrated mode for Service B obtained from the distribution server 2-2 is written to the Calibrated mode area in a form of overwriting the default image quality adjustment parameters stored earlier.

In a case where the Partner calibrated mode for Service B is set to on, image quality adjustment is performed on the basis of the image quality adjustment parameters for the Partner calibrated mode for Service B written at a time of starting-up, and on the basis of the Offset value for the Partner calibrated mode for Service B stored in the Offset storage area M2.

A business operator of each distribution service can set any kind of image quality adjustment parameters as image quality adjustment parameters for the Partner calibrated mode. That is, the types of image quality adjustment parameters included in the set of image quality adjustment parameters for the Partner calibrated mode may differ for each distribution service.

By allowing the image quality adjustment parameters to be written in a form of overwriting after the default image quality adjustment parameters are written once, the default image quality adjustment parameters can be used for image quality adjustment, for image quality adjustment parameters that are not included in the set.

Here, consider a case where the user can adjust the image quality adjustment parameters of the Partner calibrated mode such as the Brightness and the Color in accordance with his/her preference, and image quality adjustment parameters after the adjustment are written to the Calibrated mode area by the content viewing application. In this case, after information in the Calibrated mode area is reset once, user's setting contents are also reset.

By causing the Offset value for each distribution service to be stored in the Offset storage area M2, which is a non-volatile storage area, and making the image quality adjustment to be performed using the image quality adjustment parameters written at a time of starting-up and the Offset value, it becomes possible to perform image quality adjustment to reflect user's setting contents.

The image quality adjustment parameters in the Partner calibrated mode include parameters that include multiple sub-parameters, such as for a standard dynamic range (SDR)/for a high dynamic range (HDR)/for a Dolby Vision HDR/ . . . . For example, in a case where a content to start reproduction is the SDR content, the sub-parameters for the SDR are used, and HDR sub-parameters are used in a case of the HDR content.

At a time of writing image quality adjustment parameters to the parameter storage area M1, multiple sub-parameters are collectively acquired from the distribution server 2 regardless of the type of the content to start reproduction, such as SDR/HDR, and are written to the parameter storage area M1. In a case where the content to start reproduction is the SDR content, the HDR sub-parameters are to be parameters prepared in advance for when the type is switched.

Other

In a case where the Partner Offset is set by the user, a log showing setting contents may be transmitted to the distribution server 2.

In this case, an Offset value of the Partner Offset set in a case where the Partner calibrated mode for Service A is on is transmitted to the distribution server 2-1 by the content viewing application 12-A.

Furthermore, an Offset value of the Partner Offset set in a case where the Partner calibrated mode for Service B is on is transmitted to the distribution server 2-2 by the content viewing application 12-B.

Configuration Example of Computer

The series of processes described above can be executed by hardware or software. In a case of executing the series of processes by software, a program that forms the software is installed from a program recording medium to a computer incorporated in dedicated hardware, to a general-purpose personal computer, or the like.

Figure 23:
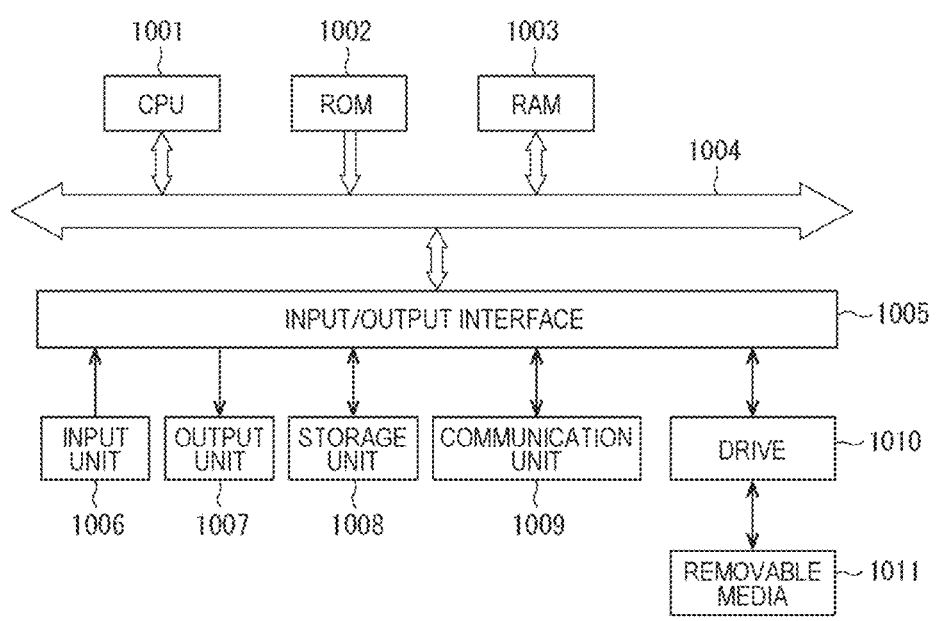
FIG. 23 is a block diagram showing a configuration example of a computer.

FIG. 23 is a block diagram showing a configuration example of hardware of a computer that executes the series of processes described above in accordance with a program.

A central processing unit (CPU) 1001, a read only memory (ROM) 1002, and a random access memory (RAM) 1003 are mutually connected by a bus 1004.

The bus 1004 is further connected with an input/output interface 1005. The input/output interface 1005 is connected with an input unit 1006 including a keyboard, a mouse, and the like, and an output unit 1007 including a display device, a speaker, and the like. Furthermore, the input/output interface 1005 is connected with a storage unit 1008 including a hard disk, a non-volatile memory, and the like, a communication unit 1009 including a network interface and the like, and a drive 1010 that drives a removable media 1011.

In the computer configured as described above, the series of processes described above are performed, for example, by the CPU 1001 loading a program recorded in the storage unit 1008 into the RAM 1003 via the input/output interface 1005 and the bus 1004, and executing.

The program to be executed by the CPU 1001 is provided, for example, by being recorded on the removable media 1011 or via wired or wireless transfer media such as a local area network, the Internet, and digital broadcasting, to be installed in the storage unit 1008.

Note that the program executed by the computer may be a program that performs processing in a time series according to an order described in this specification, or may be a program that performs processing in parallel or at necessary timing such as when a call is made.

In this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

The effects described in this specification are merely examples and are not limited, and other effects may also be present.

The embodiment of the present technology is not limited to the above-described embodiment, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

Combination Example of Configuration

The present technology can have the following configurations.

(1)

An image processing apparatus including:

a display control unit that controls to display an image quality adjustment menu including display related to setting of an image quality adjustment mode for a specific distribution service, in a case where an instruction is made to perform image quality adjustment during execution of an application that is used for viewing a content distributed by the specific distribution service.

(2)

The image processing apparatus according to (1) above, in which the display control unit controls to display the image quality adjustment menu that does not include display related to setting of the image quality adjustment mode, in a case where an instruction is made to perform image quality adjustment during execution of an application that is used for viewing a content distributed by another distribution service.

(3)

The image processing apparatus according to (1) or (2) above, in which the display control unit controls to display the image quality adjustment menu including display to be used for setting of on of the image quality adjustment mode or off of the image quality adjustment mode.

(4)

The image processing apparatus according to (3) above, further including:

an image quality adjustment control unit that adjusts image quality of a content distributed by the specific distribution service, in accordance with an image quality adjustment parameter that is preset, in a case where the image quality adjustment mode is set to on.

(5)

The image processing apparatus according to (3) or (4) above, in which in a case where the image quality adjustment mode is set to on, the display control unit causes displaying, in an inoperable state, of display to be used for setting of another image quality adjustment mode.

(6)

The image processing apparatus according to any one of (3) to (5) above, in which in a case where the image quality adjustment mode is set to on, the display control unit causes displaying, in an operable state, of display to be used for setting of each item related to image quality adjustment.

(7)

The image processing apparatus according to any one of (4) to (6) above, in which the image quality adjustment parameter is set as a parameter common to all contents distributed by the specific distribution service.

(8)

The image processing apparatus according to any one of (4) to (6) above, in which in a case where the image quality adjustment parameter is set for each content distributed by the specific distribution service, the image quality adjustment control unit acquires, from a server, the image quality adjustment parameter of a content to be reproduced, and adjusts image quality of the content.

(9)

The image processing apparatus according to (4) above, in which there is a plurality of the specific distribution services, and the image quality adjustment control unit adjusts image quality of a content distributed by each of the specific distribution services in accordance with the image quality adjustment parameter for each of the specific distribution services.

(10)

The image processing apparatus according to (9) above, in which the image quality adjustment control unit adjusts image quality of a content distributed by each of the specific distribution services in accordance with the image quality adjustment parameter for each of the specific distribution services and in accordance with an Offset value.

(11)

The image processing apparatus according to (10) above, in which the image quality adjustment control unit acquires the image quality adjustment parameter for each of the specific distribution services from a server that provides each of the specific distribution services, and acquires the Offset value for each of the specific distribution services in accordance with a user's operation.

(12)

A display control method in which an image processing apparatus controls to display an image quality adjustment menu including display related to setting of an image quality adjustment mode for a specific distribution service, in a case where an instruction is made to perform image quality adjustment during execution of an application that is used for viewing a content distributed by the specific distribution service.

(13)

A program for causing a computer to execute processing of controlling to display an image quality adjustment menu including display related to setting of an image quality adjustment mode for a specific distribution service, in a case where an instruction is made to perform image quality adjustment during execution of an application that is used for viewing a content distributed by the specific distribution service.

REFERENCE SIGNS LIST

1 TV
2-1 to 2-N Distribution server
11 TV OS
12-1 TV viewing application
12-2 Search application
12-3 Image quality adjustment application
12-A to 12-N Content viewing application
121 Content reproduction control unit
122 Image quality adjustment control unit
123 Menu display control unit

The invention claimed is:

1. An image processing apparatus comprising:
circuitry configured to:
display an image quality adjustment menu including display related to setting of an image quality adjustment mode for a specific distribution service, in a case where an instruction is made to perform image quality adjustment during execution of an application that is used for viewing a content distributed by the specific distribution service;
adjust image quality of the content distributed by the specific distribution service in accordance with an image quality adjustment parameter for the specific distribution service in which the specific distribution service is selected from a plurality of distribution services provided individually by different service operators; and
display the image quality adjustment menu including display to be used for setting the image quality adjustment mode to on or for setting the image quality adjustment mode to off,
wherein in a case where the image quality adjustment mode is set to on, the circuitry causes displaying, in an inoperable state, of display to be used for setting of another image quality adjustment mode, and
wherein the circuitry is configured such that content from each of the plurality of distribution services is received by a single input.

2. The image processing apparatus according to claim 1, wherein
the circuitry is further configured to display the image quality adjustment menu that does not include display related to setting of the image quality adjustment mode, in a case where an instruction is made to perform image quality adjustment during execution of an application that is used for viewing a content distributed by another distribution service.

3. The image processing apparatus according to claim 1, wherein
the circuitry is further configured to adjust image quality of the content distributed by the specific distribution service, in accordance with image quality adjustment parameter that is preset, in a case where the image quality adjustment mode is set to on.

4. The image processing apparatus according to claim 1, wherein
in a case where the image quality adjustment mode is set to on, the circuitry causes displaying, in an operable state, of display to be used for setting of each item related to image quality adjustment.

5. The image processing apparatus according to claim 3, wherein
the image quality adjustment parameter is set as a parameter common to all contents distributed by the specific distribution service.

6. The image processing apparatus according to claim 3, wherein
in a case where the image quality adjustment parameter is set for each content distributed by the specific distribution service,
the circuitry acquires, from a server, the image quality adjustment parameter of a content to be reproduced, and adjusts image quality of the content.

7. The image processing apparatus according to claim 3, wherein
the circuitry adjusts image quality of a content distributed by each of the specific distribution services in accordance with the image quality adjustment parameter for each of the specific distribution services and in accordance with an Offset value.

8. The image processing apparatus according to claim 7, wherein
the circuitry acquires the image quality adjustment parameter for each of the specific distribution services from a server that provides each of the specific distribution services, and
acquires the Offset value for each of the specific distribution services in accordance with a user's operation.

9. A display comprising circuitry configured to:
display an image quality adjustment menu including display related to setting of an image quality adjustment mode for a specific distribution service, in a case where an instruction is made to perform image quality adjustment during execution of an application that is used for viewing a content distributed by the specific distribution service;
adjust image quality of the content distributed by the specific distribution service in accordance with an image quality adjustment parameter for the specific distribution service in which the specific distribution service is selected from a plurality of distribution services provided individually by different service operators; and
display the image quality adjustment menu including display to be used for setting the image quality adjustment mode to on or for setting the image quality adjustment mode to off,
wherein in a case where the image quality adjustment mode is set to on, the circuitry causes displaying, in an inoperable state, of display to be used for setting of another image quality adjustment mode, and
wherein the circuitry is configured such that content from each of the plurality of distribution services is received by a single input.

10. An apparatus comprising circuitry configured to:
execute processing of controlling to display an image quality adjustment menu including display related to setting of an image quality adjustment mode for a specific distribution service, in a case where an instruction is made to perform image quality adjustment during execution of an application that is used for viewing a content distributed by the specific distribution service;
adjust image quality of the content distributed by the specific distribution service in accordance with an image quality adjustment parameter for the specific distribution service in which the specific distribution service is selected from a plurality of distribution services provided individually by different service operators; and display the image quality adjustment menu including display to be used for setting the image quality adjustment mode to on or for setting the image quality adjustment mode to off, wherein in a case where the image quality adjustment mode is set to on, the circuitry causes displaying, in an inoperable state, of display to be used for setting of another image quality adjustment mode, and wherein the circuitry is configured such that content from each of the plurality of distribution services is received by a single input.

11. The display according to claim 9, wherein the circuitry is further configured to display the image quality adjustment menu that does not include display related to setting of the image quality adjustment mode, in a case where an instruction is made to perform image quality adjustment during execution of an application that is used for viewing a content distributed by another distribution service.

12. The display according to claim 11, wherein the circuitry is further configured to adjust image quality of the content distributed by the specific distribution service, in accordance with image quality adjustment parameter that is preset, in a case where the image quality adjustment mode is set to on.

13. The display according to claim 9, wherein the circuitry is configured to receive instructions from a user through a remote controller.

14. The display according to claim 13, wherein the circuitry is configured to empower the user to select predetermined setting values.

15. The display according to claim 13, wherein the circuitry is configured to permit the user to view content with image quality intended by a service operator.

16. The display according to claim 13, wherein the single input is a single tuner configured to receive a broadcast wave signal supplied from a satellite broadcast or cable TV set-top box, and further configured to extract a signal of a channel selected by the user.

* * * * *